US012165794B2

(12) United States Patent
Yoshidome et al.

(10) Patent No.: US 12,165,794 B2
(45) Date of Patent: Dec. 10, 2024

(54) SOFT MAGNETIC ALLOY AND MAGNETIC DEVICE

(71) Applicant: TDK CORPORATION, Tokyo (JP)

(72) Inventors: Kazuhiro Yoshidome, Tokyo (JP); Hiroyuki Matsumoto, Tokyo (JP); Kenji Horino, Tokyo (JP); Akito Hasegawa, Tokyo (JP); Syota Goto, Tokyo (JP); Masakazu Hosono, Tokyo (JP); Hajime Amano, Tokyo (JP); Isao Nakahata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 298 days.

(21) Appl. No.: 16/260,715

(22) Filed: Jan. 29, 2019

(65) Prior Publication Data

US 2019/0237229 A1 Aug. 1, 2019

(30) Foreign Application Priority Data

Jan. 30, 2018 (JP) ................................. 2018-013733

(51) Int. Cl.
*H01F 1/147* (2006.01)
*B22D 23/00* (2006.01)
(Continued)

(52) U.S. Cl.
CPC ....... *H01F 1/14733* (2013.01); *B22D 23/003* (2013.01); *B22F 1/07* (2022.01);
(Continued)

(58) Field of Classification Search
CPC .. H01F 1/14–28; H01F 1/14733; H01F 1/147; H01F 1/14716; H01F 1/14766; H01F 1/14775; H01F 1/14791; H01F 1/15308; H01F 1/15333; B22D 23/003; C21D 6/00–04; C21D 8/12–1294; C21D 1/26; C21D 1/30; C21D 6/007; C21D 6/008; C21D 8/1255; C21D 9/46; C21D 9/52; C21D 2201/03; C22C 38/00–60; C22C 45/02; C22C 45/04; C22C 33/0257;
(Continued)

(56) References Cited

U.S. PATENT DOCUMENTS

2004/0258950 A1* 12/2004 Sonobe ................. C04B 35/532 428/689
2006/0118207 A1* 6/2006 Yoshizawa .......... H01F 1/15316 148/307
(Continued)

FOREIGN PATENT DOCUMENTS

CN 101834046 B 10/2012
CN 104934179 A 9/2015
(Continued)

OTHER PUBLICATIONS

Tohoku University, "Success in producing a completely rare-earth free FeNi magnet," 2015. Phys.org (Year: 2015).*

*Primary Examiner* — Adil A. Siddiqui
(74) *Attorney, Agent, or Firm* — Oliff PLC

(57) ABSTRACT

A soft magnetic alloy has a main component of Fe. The soft magnetic alloy contains P. A Fe-rich phase and a Fe-poor phase are contained. An average concentration of P in the Fe-poor phase is 1.5 times or larger than an average concentration of P in the soft magnetic alloy by number of atoms.

9 Claims, 3 Drawing Sheets

(51) Int. Cl.

| | |
|---|---|
| ***B22F 1/07*** | (2022.01) |
| ***C21D 1/26*** | (2006.01) |
| ***C21D 1/30*** | (2006.01) |
| ***C21D 6/00*** | (2006.01) |
| ***C21D 8/12*** | (2006.01) |
| ***C21D 9/46*** | (2006.01) |
| ***C21D 9/52*** | (2006.01) |
| ***C22C 33/02*** | (2006.01) |
| ***C22C 38/00*** | (2006.01) |
| ***C22C 38/02*** | (2006.01) |
| ***C22C 38/08*** | (2006.01) |
| ***C22C 38/10*** | (2006.01) |
| ***C22C 38/12*** | (2006.01) |
| ***C22C 38/16*** | (2006.01) |
| ***C22C 45/00*** | (2023.01) |
| ***C22C 45/02*** | (2006.01) |
| ***C22C 45/04*** | (2006.01) |
| ***H01F 1/153*** | (2006.01) |
| *B22F 9/02* | (2006.01) |
| *B22F 9/04* | (2006.01) |
| *C22C 38/40* | (2006.01) |
| *C22C 38/52* | (2006.01) |

(52) U.S. Cl.

CPC ................. *C21D 1/26* (2013.01); *C21D 1/30* (2013.01); *C21D 6/00* (2013.01); *C21D 6/001* (2013.01); *C21D 6/007* (2013.01); *C21D 6/008* (2013.01); *C21D 8/1255* (2013.01); *C21D 9/46* (2013.01); *C21D 9/52* (2013.01); *C22C 33/0257* (2013.01); *C22C 38/002* (2013.01); *C22C 38/005* (2013.01); *C22C 38/02* (2013.01); *C22C 38/08* (2013.01); *C22C 38/10* (2013.01); *C22C 38/105* (2013.01); *C22C 38/12* (2013.01); *C22C 38/16* (2013.01); *C22C 45/008* (2013.01); *C22C 45/02* (2013.01); *C22C 45/04* (2013.01); *H01F 1/147* (2013.01); *H01F 1/14716* (2013.01); *H01F 1/14766* (2013.01); *H01F 1/14775* (2013.01); *H01F 1/14791* (2013.01); *H01F 1/15308* (2013.01); *H01F 1/15333* (2013.01); *B22F 9/023* (2013.01); *B22F 2009/048* (2013.01); *B22F 2998/10* (2013.01); *B22F 2999/00* (2013.01); *C21D 2201/03* (2013.01); *C22C 33/0214* (2013.01); *C22C 33/0264* (2013.01); *C22C 33/0271* (2013.01); *C22C 33/0278* (2013.01); *C22C 33/0285* (2013.01); *C22C 38/40* (2013.01); *C22C 38/52* (2013.01); *C22C 2200/04* (2013.01); *C22C 2202/02* (2013.01)

(58) Field of Classification Search

CPC ..... C22C 38/002; C22C 38/005; C22C 38/02; C22C 38/105; C22C 45/008; C22C 33/0214; C22C 33/0264; C22C 33/0271; C22C 33/0278; C22C 33/0285; C22C 2200/04; C22C 2202/02; B22F 9/023; B22F 2009/048; B22F 1/07; B22F 2998/10; B22F 2999/00

See application file for complete search history.

(56) References Cited

U.S. PATENT DOCUMENTS

| | | | | |
|---|---|---|---|---|
| 2007/0079907 | A1* | 4/2007 | Johnson | C22C 38/00 148/403 |
| 2010/0098576 | A1* | 4/2010 | Yoshizawa | C22C 38/16 420/92 |
| 2010/0108196 | A1* | 5/2010 | Ohta | C22C 38/02 148/121 |
| 2012/0199254 | A1* | 8/2012 | Urata | C22C 33/003 148/579 |
| 2018/0044768 | A1* | 2/2018 | Makino | C22C 19/03 |
| 2018/0122540 | A1 | 5/2018 | Matsumoto et al. | |
| 2018/0122542 | A1 | 5/2018 | Matsumoto et al. | |
| 2018/0122543 | A1 | 5/2018 | Harada et al. | |
| 2019/0185950 | A1* | 6/2019 | Onodera | C22C 38/10 |

FOREIGN PATENT DOCUMENTS

| | | | | | |
|---|---|---|---|---|---|
| CN | 104073749 | B | | 3/2017 | |
| JP | 2002-146494 | A | | 5/2002 | |
| JP | 2002-155348 | A | | 5/2002 | |
| JP | 3342767 | B2 | | 11/2002 | |
| JP | 4856602 | B2 | | 1/2012 | |
| JP | 2012012699 | A | * | 1/2012 | C22C 38/008 |
| JP | 6160759 | B1 | | 7/2017 | |
| JP | 6160760 | B1 | | 7/2017 | |
| JP | 6256647 | B1 | | 1/2018 | |

* cited by examiner

SOFT MAGNETIC ALLOY AND MAGNETIC DEVICE

BACKGROUND OF THE INVENTION

The present invention relates to a soft magnetic alloy and a magnetic device.

Low power consumption and high efficiency have been demanded in electronic, information, communication equipment, and the like. Moreover, the above demands are becoming stronger for a low carbon society. Thus, reduction in energy loss and improvement in power supply efficiency are also required for power supply circuits of electronic, information, communication equipment, and the like. Then, improvement in permeability and reduction in core loss (magnetic core loss) are required for magnetic cores of ceramic elements used in the power supply circuit. The reduction in core loss reduces the loss of power energy, and high efficiency and energy saving are achieved.

Patent Document 1 discloses a Fe—B-M based soft magnetic amorphous alloy (M=Ti, Zr, Hf, V, Nb, Ta, Mo, and W). This soft magnetic amorphous alloy has favorable soft magnetic properties, such as a high saturation magnetic flux density, compared to a saturation magnetic flux density of a commercially available Fe based amorphous material.

Patent Document 1: JP3342767 (B2)

BRIEF SUMMARY OF INVENTION

As a method of reducing the core loss of the magnetic core, it is conceivable to reduce coercivity of a magnetic material constituting the magnetic core.

It is an object of the invention to provide a soft magnetic alloy having a high saturation magnetic flux density Bs, a low coercivity Hc, and a high resistivity p.

To achieve the above object, a soft magnetic alloy according to the present invention includes:

a main component of Fe; and

P, wherein a Fe-rich phase and a Fe-poor phase are contained, and an average concentration of P in the Fe-poor phase is 1.5 times or larger than an average concentration of P in the soft magnetic alloy by number of atoms.

The soft magnetic alloy according to the present invention has the above features and thereby has a high saturation magnetic flux density Bs, a low coercivity Hc, and a high resistivity ρ.

In the soft magnetic alloy according to the present invention, the average concentration of P in the Fe-poor phase may be 1.0 at % or more and 50 at % or less.

In the soft magnetic alloy according to the present invention, the average concentration of P in the Fe-poor phase may be 3.0 times or larger than an average concentration of P in the Fe-rich phase.

The soft magnetic alloy according to the present invention may include a composition formula of $(Fe_{1-\alpha}X_{\alpha})_{(1-(a+b+c+d+e))}Cu_aM1_bP_cM2_d\,Si_e$, in which X is one or more of Co and Ni, M1 is one or more of Ti, Zr, Hf, Nb, Ta, Mo, V, W, Cr, Al, Mn, Zn, La, Y, and S, M2 is one or more of B and C, $0 \le a \le 0.030$ is satisfied, $0 \le b \le 0.150$ is satisfied, $0.001 \le c \le 0.150$ is satisfied, $0 \le d \le 0.200$ is satisfied, $0 \le e \le 0.200$ is satisfied, and $0 \le \alpha \le 0.500$ is satisfied.

The soft magnetic alloy according to the present invention may contain Fe based nanocrystallines.

In the soft magnetic alloy according to the present invention, the Fe based nanocrystallines may have an average grain size of 5 nm or more and 30 nm or less.

The soft magnetic alloy according to the present invention may have a ribbon shape.

The soft magnetic alloy according to the present invention may have a powder shape.

A magnetic device according to the present invention is composed of any of the above-mentioned soft magnetic alloys.

DETAILED DESCRIPTION OF INVENTION

Hereinafter, an embodiment of the present invention is explained.

A soft magnetic alloy according to the present embodiment has a main component of Fe and contains P. Specifically, having a main component of Fe means that a Fe content to the entire soft magnetic alloy is 65 at % or more.

Hereinafter, a fine structure, a Fe distribution, and a P distribution of the soft magnetic alloy according to the present embodiment are explained with reference to the figures.

Figure 1:
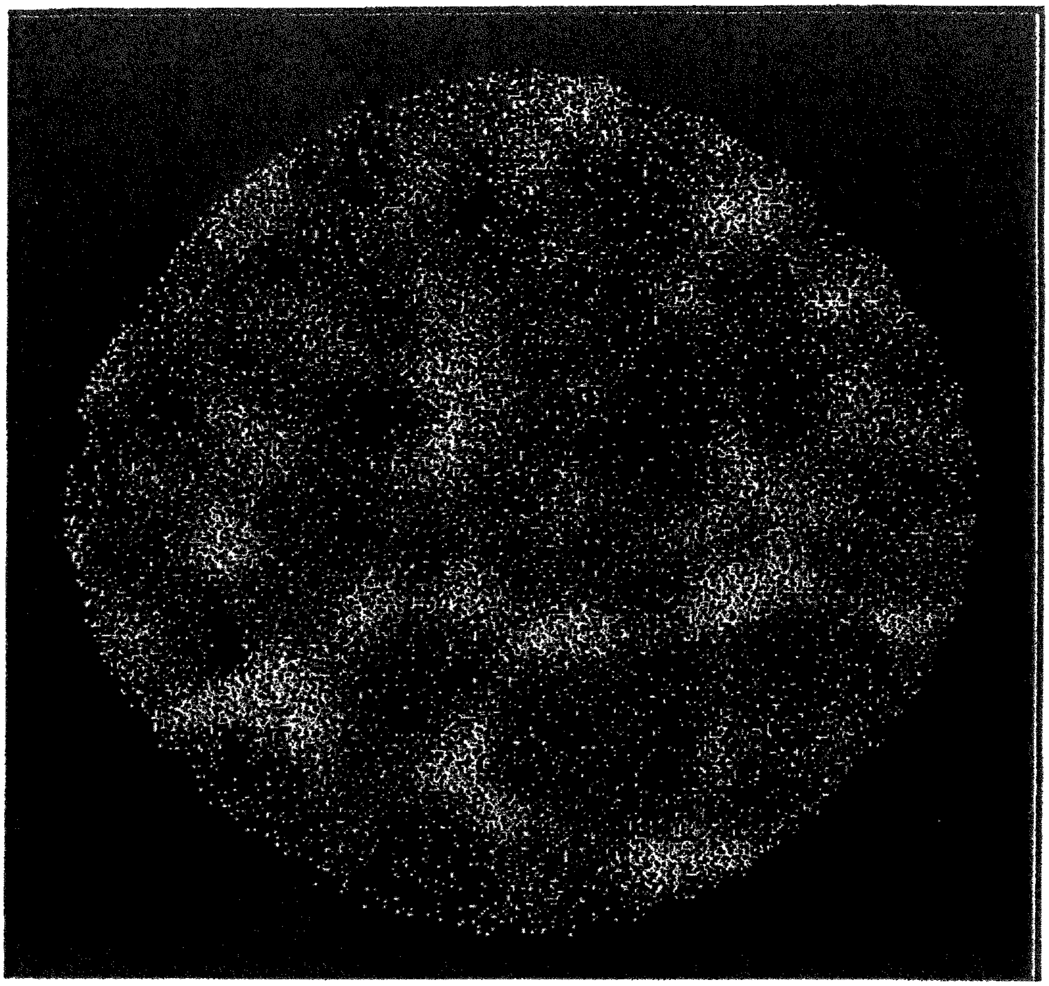
FIG. 1 is an observation result of Fe distribution of the soft magnetic alloy of the present invention using a 3DAP.

When a Fe distribution of the soft magnetic alloy according to the present embodiment (thickness: 5 nm) is observed by a three-dimensional atom probe (hereinafter, also referred to as 3DAP), a portion having a large Fe content and a portion having a small Fe content are observed as shown in FIG. 1.

Figure 2:
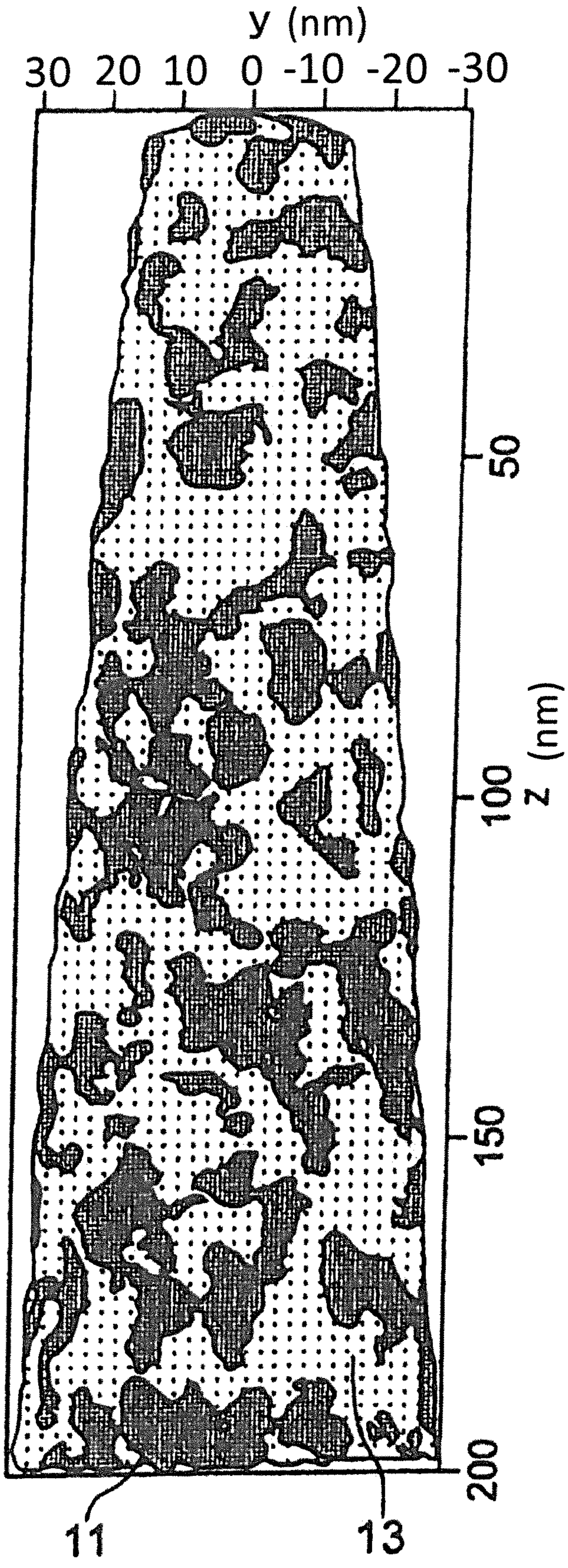
FIG. 2 is a schematic view of a binarized result of Fe content obtained by observing the soft magnetic alloy of the present invention using a 3DAP.

Here, FIG. 2 is a schematic view of a binarized result between a portion having a high Fe concentration and a portion having a low Fe concentration obtained by observing a measurement point differing from that of FIG. 1 in the same manner as FIG. 1. Then, a Fe-rich phase 11 is defined as a portion whose Fe concentration is equal to or higher than a Fe average concentration of the soft magnetic alloy, and a Fe-poor phase 13 is a portion whose Fe concentration is lower than a Fe average concentration of the soft magnetic alloy by 0.1 at % or more. Incidentally, a Fe average concentration of the soft magnetic alloy is the same as a Fe content of a composition of the soft magnetic alloy. In a large part of FIG. 2, the Fe-rich phases 11 exist like islands, and the Fe-poor phases 13 are located around the Fe-rich phases 11. However, the Fe-rich phases 11 do not necessarily exist like islands, and the Fe-poor phases 13 are not necessarily located around the Fe-rich phases 11. Incidentally, there is no limit to area ratio of the Fe-rich phases 11 or area ratio of the Fe-poor phases 13 in the entire soft magnetic alloy. For example, the Fe-rich phases 11 have an area ratio of 20% or more and 80% or less, and the Fe-poor phases 13 have an area ratio of 20% or more and 80% or less.

The soft magnetic alloy according to the present embodiment is characterized in that an average concentration of P in the Fe-poor phases 13 is 1.5 times or larger than an average concentration of P in the soft magnetic alloy by number of atoms. That is, the soft magnetic alloy according to the present embodiment has a variation in Fe concentration and has a large amount of P in a portion having a small Fe concentration, in observation by 3DAP (thickness: 5 nm). Since the soft magnetic alloy according to the present embodiment has this feature, the Fe-poor phases 13 can have a high resistance, and resistivity ρ can be improved while good magnetic characteristics are achieved. Specifically, good magnetic characteristics mean a high saturation magnetic flux density Bs and a low coercivity Hc.

Preferably, the Fe-poor phases 13 have a P average concentration of 1.0 at % or more and 50 at % or less. When the Fe-poor phases 13 have a P average concentration within the above range, saturation magnetic flux density Bs is particularly easily improved.

Moreover, an average concentration of P in the Fe-poor phases 13 is preferably 3.0 times or larger than an average concentration of P in the Fe-rich phases 11.

The Fe-rich phases 11 have a structure of Fe based nanocrystallines. The Fe-poor phases 13 have an amorphous structure. In the present embodiment, the Fe based nanocrystallines mean crystals having a grain size of 50 nm or less and a Fe content of 70 at % or more.

In the present embodiment, the Fe based nanocrystallines have any grain size, but preferably have an average grain size of 5 nm or more and 30 nm or less, and more preferably have an average grain size of 10 nm or more and 30 nm or less. When the Fe based nanocrystallines have an average grain size within the above range, coercivity Hc tends to be lower. Incidentally, an average grain size of nanocrystallines can be measured by powder X-ray diffraction using an XRD.

In addition to Fe and P mentioned above, the Fe-rich phases 11 of the soft magnetic alloy according to the present embodiment may further contain a sub-component selected from one or more of B, C, Ti, Zr, Hf, Nb, Ta, Mo, V, W, Cr, Al, Mn, Zn, Cu, Si, La, Y, and S. When the Fe-rich phases 11 contain the sub-component, coercivity is low while saturation magnetic flux density is maintained, that is, soft magnetic characteristics are improved (particularly, favorable soft magnetic characteristics are obtained in high-frequency regions). In addition to Fe and P mentioned above, the Fe-poor phases 13 may also further contain the above sub-component.

The composition of the entire soft magnetic alloy can be confirmed by ICP measurement and X-ray fluorescence measurement. The composition of the Fe-rich phases 11 and the composition of the Fe-poor phases 13 can be measured by 3DAP. Then, an average concentration of P in the Fe-rich phases 11 and an average concentration of P in the Fe-poor phases 13 can also be calculated from the above-mentioned measurement result.

The soft magnetic alloy according to the present embodiment has any composition except for containing Fe and P, but preferably has the following composition (1).

The composition (1) is represented by a composition formula of $(Fe_{1-\alpha}X_{\alpha})_{(1-(a+b+c+d+e))}Cu_aM1_bP_cM2_d\,Si_e$, in which X is one or more of Co and Ni, M1 is one or more of Ti, Zr, Hf, Nb, Ta, Mo, V, W, Cr, Al, Mn, Zn, La, Y, and S, M2 is one or more of B and C, $0 \le a \le 0.030$ is satisfied, $0 \le b \le 0.150$ is satisfied, $0.001 \le c \le 0.150$ is satisfied, $0 \le d \le 0.200$ is satisfied, $0 \le e \le 0.200$ is satisfied, and $0 \le \alpha \le 0.500$ is satisfied.

In the following each element content of the soft magnetic alloy, the entire soft magnetic alloy is 100 at % if there is no specific description for parameter. When the soft magnetic alloy has the above-mentioned composition (1), the soft magnetic alloy has a Fe average concentration of $100\times(1-\alpha)(1-(a+b+c+d+e))$ (at %), and the soft magnetic alloy has a P average concentration of $100\times c$ (at %).

Preferably, the Cu content (a) is 3.0 at % or less (including zero). That is, Cu may not be contained. The smaller a Cu content is, the more easily a ribbon composed of a soft magnetic alloy containing the Fe-rich phases 11 and the Fe-poor phases 13 tends to be manufactured by a single roller method mentioned below. On the other hand, the larger a Cu content is, the larger a reduction effect of coercivity becomes. In view of reduction in coercivity, the Cu content (a) is preferably 0.1 at % or more. M1 is one or more of Ti, Zr, Hf, Nb, Ta, Mo, V, W, Cr, Al, Mn, Zn, La, Y, and S. Preferably, M1 is one or more of Zr, Hf, and Nb. This tends to facilitate preparation of a ribbon composed of a soft magnetic alloy containing the Fe-rich phases 11 and the Fe-poor phases 13 by the following single roller method.

Preferably, the M1 content (b) is 15.0 at % or less (including zero). That is, M1 may not be contained. When the M1 content (b) is 15.0 at % or less (including zero), saturation magnetic flux density Bs is improved easily.

Preferably, the P content (c) is 0.1 at % or more and 15.0 at % or less. When the P content (c) is within this range, saturation magnetic flux density Bs is improved easily.

M2 is one or more of B and C.

Preferably, the M2 content (d) is 20.0 at % or less (including zero). That is, M2 may not be contained. When M2 is added within the above range, saturation magnetic flux density Bs is improved easily.

Preferably, the Si content (e) is 20.0 at % or less (including zero). That is, Si may not be contained.

In the soft magnetic alloy according to the present embodiment, a part of Fe may be substituted by X. X is one or more of Co and Ni.

A substitution ratio (α) of Fe by X may be 50 at % or less (including zero). If the substitution ratio (α) is too large, the Fe-rich phases 11 and the Fe-poor phases 13 are hard to be generated.

The X content ($\alpha(1-(a+b+c+d+e))$) may be 40 at % or less (including zero).

The soft magnetic alloy according to the present embodiment has the following representative compositions (2) to (4).

The composition (2) is represented by a composition formula of $(Fe_{1-\alpha}X_{\alpha})_{(1-(a+b+c+d+e))}\,Cu_aM1_bP_cM2_d\,Si_e$, in which X is one or more of Co and Ni, M1 is one or more of Ti, Zr, Hf, Nb, Ta, Mo, V, W, Cr, Al, Mn, Zn, La, Y, and S, M2 is one or more of B and C, $0 \le a \le 0.030$ is satisfied, $0.020 \le b \le 0.150$ is satisfied, $0.001 \le c \le 0.150$ is satisfied, $0.025 \le d \le 0.200$ is satisfied, $0 \le e \le 0.070$ is satisfied, and $0 \le \alpha \le 0.500$ is satisfied.

In the composition (2), the Cu content (a) is preferably 3.0 at % or less (including zero). When the Cu content (a) is 3.0 at % or less, it becomes easier to manufacture a ribbon composed of a soft magnetic alloy containing the Fe-rich phases 11 and the Fe-poor phases 13 by a single roller method mentioned below.

In the composition (2), the M1 content (b) is preferably 2.0 at % or more and 12.0 at % or less. When the M1 content (b) is 2.0 at % or more, it becomes easier to manufacture a ribbon composed of a soft magnetic alloy containing the Fe-rich phases 11 and the Fe-poor phases 13 by a single roller method mentioned below. When the M1 content (b) is 12.0 at % or less, saturation magnetic flux density Bs is improved easily.

In the composition (2), the P content (c) is preferably 1.0 at % or more and 10.0 at % or less. When the P content (c) is 1.0 at % or more, resistivity ρ is improved easily. When the P content (c) is 10.0 at % or less, saturation magnetic flux density Bs is improved easily.

In the composition (2), the M2 content (d) is preferably 2.5 at % or more and 15.0 at % or less. When the M2 content (d) is 2.5 at % or more, it becomes easier to manufacture a ribbon composed of a soft magnetic alloy containing the Fe-rich phases 11 and the Fe-poor phases 13 by a single roller method mentioned below. When the M2 content (d) is 15.0 at % or less, saturation magnetic flux density Bs is improved easily.

The composition (3) is represented by a composition formula of $(Fe_{1-\alpha}X_{\alpha})_{(1-(a+b+c+d+e))}Cu_aM1_bP_cM2_d\ Si_e$, in which X is one or more of Co and Ni, M1 is one or more of Ti, Zr, Hf, Nb, Ta, Mo, V, W, Cr, Al, Mn, Zn, La, Y, and S, M2 is one or more of B and C, $0 \le a \le 0.030$ is satisfied, $0.010 \le b \le 0.100$ is satisfied, $0.001 \le c \le 0.070$ is satisfied, $0.020 \le d \le 0.140$ is satisfied, $0.070 \le e \le 0.175$ is satisfied, and $0 \le \alpha \le 0.500$ is satisfied.

In the composition (3), the M1 content (d) is preferably 1.0 at % or more and 5.0 at % or less. When the M1 content (d) is 5.0 at % or less, saturation magnetic flux density Bs is improved easily.

In the composition (3), the P content (c) is preferably 0.5 at % or more and 5.0 at % or less. When the P content (c) is 0.5 at % or more, resistivity ρ is improved easily. When the P content (c) is 5.0 at % or less, saturation magnetic flux density Bs is improved easily.

In the composition (3), the M2 content (d) is preferably 9.0 at % or more and 11.0 at % or less. When the M2 content (d) is 9.0 at % or more, coercivity Hc is decreased easily. When the M2 content (d) is 11.0 at % or less, saturation magnetic flux density Bs is improved easily. The B content may be 2.0 at % or more and 10.0 at % or less. The C content may be 5.0 at % or less (including zero).

In the composition (3), the Si content (e) is preferably 10.0 at % or more and 17.5 at % or less. When the Si content (e) is 10.0 at % or more, coercivity Hc is improved easily.

The composition (4) is represented by a composition formula of $(Fe_{1-\alpha}X_{\alpha})_{(1-(a+b+c+d+e))}Cu_aM1_bP_cM2_d\ Si_e$, in which X is one or more of Co and Ni, M1 is one or more of Ti, Zr, Hf, Nb, Ta, Mo, V, W, Cr, Al, Mn, Zn, La, Y, and S, M2 is one or more of B and C, $0 \le a \le 0.010$ is satisfied, $0 \le b \le 0.010$ is satisfied, $0.010 \le c \le 0.150$ is satisfied, $0.090 \le d \le 0.130$ is satisfied, $0 \le e \le 0.080$ is satisfied, and $0 \le \alpha \le 0.500$ is satisfied.

In the composition (4), the P content (c) is preferably 1.0 at % or more and 7.0 at % or less. When the P content (c) is 7.0 at % or less, saturation magnetic flux density Bs is improved easily.

In the composition (4), the Si content (e) is preferably 2.0 at % or more and 8.0 at % or less. When the Si content (e) is 2.0 at % or more, coercivity Hc is decreased easily.

Hereinafter, explained is a method of manufacturing the soft magnetic alloy according to the present embodiment.

The soft magnetic alloy according to the present embodiment is manufactured by any method. For example, a ribbon of a soft magnetic alloy is manufactured by a single roller method.

In the single roller method, various raw materials (e.g., pure metals of respective metal elements contained in a soft magnetic alloy to be finally obtained) are initially prepared and weighed so that a composition identical to that of the soft magnetic alloy to be finally obtained is obtained. Then, the pure metals of the metal elements are melted and mixed, and a base alloy is prepared. Incidentally, the pure metals are melted by any method. For example, the pure metals are melted by high-frequency heating after a chamber is evacuated. Incidentally, the base alloy and the soft magnetic alloy to be finally obtained normally have the same composition.

Next, the prepared base alloy is heated and melted, and a molten metal is obtained. The molten metal has any temperature, and may have a temperature of 1200 to 1500° C., for example.

Figure 3:
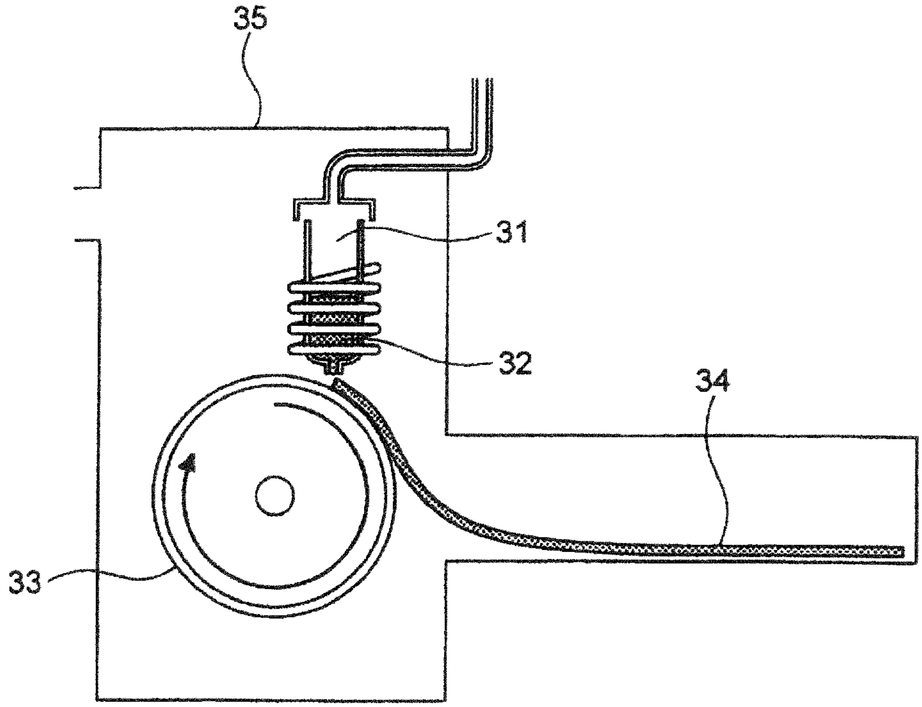
FIG. 3 is a schematic view of a single roller method.

FIG. 3 is a schematic view of an apparatus used for a single roller method. In the single roller method according to the present embodiment, a molten metal 32 is sprayed and supplied from a nozzle 31 against a roller 33 rotating in the arrow direction, and a ribbon 34 is thereby manufactured in the rotating direction of the roller 33 in a chamber 35. Incidentally, the roller 33 is made by any material, such as Cu, in the present embodiment.

In the single roller method, the thickness of the ribbon to be obtained can be controlled by mainly controlling the rotating speed of the roller 33, but can also be controlled by, for example, controlling the distance between the nozzle 31 and the roller 33, the temperature of the molten metal, and the like. The ribbon has any thickness. For example, the ribbon may have a thickness of 15 to 30 μm.

Before a heat treatment mentioned below, the ribbon is preferably amorphous or in a state where only microcrystals having a small grain size exist. The ribbon undergoes a heat treatment mentioned below, and the soft magnetic alloy according to the present embodiment is thereby obtained.

Incidentally, any method is employed for confirming whether the ribbon of the soft magnetic alloy before a heat treatment contains crystals having a large grain size. For example, the existence of crystals whose particle size is about 0.01 to 10 μm can be confirmed by a normal X-ray diffraction measurement. When crystals exist in the above amorphous phase but their volume ratio is small, a normal X-ray diffraction measurement determines that there are no crystals. In this case, for example, the existence of crystals can be confirmed by obtaining a selected area electron diffraction image, a nano beam diffraction image, a bright field image, or a high resolution image of a sample thinned by ion milling using a transmission electron microscope. When a selected area electron diffraction image or a nano beam diffraction image is used, with respect to diffraction pattern, a ring-shaped diffraction is formed in case of amorphous ribbon, and diffraction spots due to crystal structure are formed in case of non-amorphous ribbon. When a bright field image or a high resolution image is used, the existence of crystals can be confirmed by visually observing the image with a magnification of $1.00\times10^5$ to $3.00\times10^5$. In the present specification, crystals are considered to exist if they can be confirmed to exist by a normal X-ray diffraction measurement, and microcrystals are considered to exist if crystals cannot be confirmed to exist by a normal X-ray diffraction measurement but can be confirmed to exist by obtaining a selected area electron diffraction image, a nano beam diffraction image, a bright field image, or a high resolution image of a sample thinned by ion milling using a transmission electron microscope.

Here, the present inventors have found that when the temperature of the roller 33 and the vapor pressure in the chamber 35 are controlled appropriately, a ribbon of a soft magnetic alloy before a heat treatment becomes amorphous easily, and the Fe-rich phases 11 having a low concentration of P and the Fe-poor phases 13 having a high concentration of P are easily obtained after the heat treatment. Specifically, the present inventors have found that a ribbon of a soft magnetic alloy becomes amorphous easily by setting a temperature of the roller 33 to 50 to 70° C. (preferably 70° C.) and setting a vapor pressure in the chamber 35 to 11 hPa or less (preferably 4 hPa or less) using an Ar gas whose dew point is adjusted.

Preferably, the roller 33 has a temperature of 50 to 70° C., and the chamber 35 has an inner vapor pressure of 11 hPa or less. When the temperature of the roller 33 and the inner vapor pressure of the chamber 35 are controlled within the above ranges, the molten metal 32 is cooled uniformly, and a ribbon of a soft magnetic alloy to be obtained before a heat treatment easily becomes a uniformly amorphous phase. Incidentally, the chamber has no lower limit for vapor pressure. The vapor pressure may be adjusted to 1 hPa or less by filling the chamber with an Ar gas whose dew point is adjusted or by controlling the chamber to a state close to vacuum. When the vapor pressure is high, an amorphous ribbon before a heat treatment is hard to be obtained, and the above-mentioned favorable fine structure is hard to be obtained after the following heat treatment even if a ribbon before the heat treatment is amorphous.

The obtained ribbon 34 undergoes a heat treatment, and favorable Fe-rich phases 11 and Fe-poor phases 13 mentioned above can thereby be obtained. At this time, if the ribbon 34 is completely amorphous, the above-mentioned favorable fine structure is obtained easily.

In the present embodiment, the heat treatment is carried out by two steps, and the above-mentioned favorable fine structure is obtained easily. A heat treatment at the first step (hereinafter, also referred to as a first heat treatment) is carried out for a so-called distortion removal. This enables the soft magnetic metal to be uniformly amorphous as much as possible.

In the present embodiment, a heat treatment at the second step (hereinafter, also referred to as a second heat treatment) is carried out at a temperature that is higher than a temperature at the first step. To prevent self-heating of the ribbon during the heat treatment at the second step, it is important to employ a setter composed of a material having a high thermal conductivity. More preferably, the material of the setter has a low specific heat. Alumina is conventionally used for materials of setter, but a material having a higher thermal conductivity, such as carbon and SiC, may be employed in the present embodiment. Specifically, a material having a thermal conductivity of 150 W/m or more is preferably employed. Moreover, a material having a specific heat of 750 J/kg or less is preferably employed. Moreover, it is preferred to reduce a thickness of a setter as much as possible and to increase a thermal response of a heater by placing a thermocouple for control under the setter.

Here, the advantages of the above-mentioned two-step heat treatment are explained. First, the role of the heat treatment at the first step is explained. The soft magnetic alloy is rapidly cooled from high temperature and solidified, and amorphous phases are thereby formed. Due to the rapid cooling from high temperature, stress by thermal contraction remains in the soft magnetic alloy, and distortion and defect are generated. The heat treatment at the first step reduces the distortion and defect in the soft magnetic alloy, and uniformly amorphous phases are thereby formed. Next, the role of the heat treatment at the second step is explained. In the heat treatment at the second step, a Fe-poor phase having a high concentration of P and a Fe-rich phase having a low concentration of P (Fe based nanocrystallines) are generated. Since the heat treatment at the first step can reduce distortion and defect and form a uniformly amorphous state, the heat treatment at the second step can generate a Fe-poor phase having a high concentration of P and a Fe-rich phase having a low concentration of P (Fe based nanocrystallines). That is, even if the heat treatment is carried out at a comparatively low temperature, a Fe-poor phase having a high concentration of P and a Fe-rich phase having a low concentration of P (Fe based nanocrystallines) can stably be generated. Thus, a heat-treatment temperature of the heat treatment at the second step tends to be lower than a heat-treatment temperature of a conventional heat treatment by one step. In other words, when a heat treatment is carried out by one step, distortion and defect remaining at the time of formation of amorphous phases and the vicinity of the distortion and defect cannot stop precedently turning into Fe-rich phases (Fe based nanocrystallines). Moreover, different phases composed of boride are formed, and Fe-poor phases do not have a sufficiently high concentration of P. Then, soft magnetic characteristics and resistivity p are deteriorated. To carry out a heat treatment as uniformly as possible in a one-step heat treatment, Fe-poor phases and Fe-rich phases (Fe based nanocrystallines) need to be generated at the same time as much as possible in the entire soft magnetic alloy. Thus, a heat-treatment temperature of a one-step heat treatment tends to be higher than that of the two-step heat treatment mentioned above.

In the present embodiment, a favorable heat-treatment temperature and a favorable heat-treatment time of the first heat treatment and the second heat treatment depend on a composition of the soft magnetic alloy. The first heat treatment has a heat-treatment temperature of about 350° C. or more and 550° C. or less and has a heat-treatment time of about 0.1 hours or more and 10 hours or less. The second heat treatment has a heat-treatment temperature of about 550° C. or more and 675° C. or less and has a heat-treatment time of about 0.1 hours or more and 10 hours or less. Depending on composition, however, a favorable heat-treatment temperature and a favorable heat-treatment time may be in a range that is different from the above range.

When heat-treatment conditions are controlled unfavorably or when a favorable heat-treatment device is not employed, an average concentration of P in Fe-poor phases is decreased, favorable soft magnetic characteristics are hard to be obtained, and resistivity p is decreased.

In addition to the above-mentioned single roller method, a powder of the soft magnetic alloy according to the present embodiment is obtained by a water atomizing method or a gas atomizing method, for example. Hereinafter, a gas atomizing method is explained.

In a gas atomizing method, a molten alloy of 1200 to 1500° C. is obtained similarly to the above-mentioned single roller method. Thereafter, the molten alloy is sprayed in a chamber, and a powder is prepared.

At this time, the above-mentioned favorable fine structure is finally easily obtained with a gas spray temperature of 50 to 100° C. and a vapor pressure of 4 hPa or less in the chamber.

After the powder is manufactured by gas atomizing method, a heat treatment is carried out by two steps in a similar manner to single roller method, and a favorable fine structure is obtained easily. In particular, a soft magnetic alloy having a high acid resistance and favorable soft magnetic characteristics can be obtained.

Hereinbefore, an embodiment of the present invention is explained, but the present invention is not limited to the above-mentioned embodiment.

The soft magnetic alloy according to the present embodiment has any shape, such as a ribbon shape and a powder shape as mentioned above. In addition to these shapes, the soft magnetic alloy according to the present embodiment may have a thin film shape, a block shape, or the like.

The soft magnetic alloy according to the present embodiment is used for any purposes. For example, the soft magnetic alloy according to the present embodiment is favorably used for magnetic cores for inductors (particularly, for power inductors). In addition to magnetic cores, the soft magnetic alloy according to the present embodiment can favorably be used for thin film inductors, magnetic heads, and transformers.

Hereinafter, explained is a method of obtaining a magnetic core and an inductor from the soft magnetic alloy according to the present embodiment, but the following method is not the only one method of obtaining a magnetic core and an inductor from the soft magnetic alloy according to the present embodiment.

For example, a magnetic core from a ribbon-shaped soft magnetic alloy is obtained by winding or laminating the ribbon-shaped soft magnetic alloy. When the ribbon-shaped soft magnetic alloy is laminated via an insulator, a magnetic core having further improved properties can be obtained.

For example, a magnetic core from a powder-shaped soft magnetic alloy is obtained by appropriately mixing the powder-shaped soft magnetic alloy with a binder and pressing this using a die. When an oxidation treatment, an insulation coating, or the like is carried out against the surface of the powder before the mixture with the binder, resistivity is improved, and the magnetic core becomes more suitable for high-frequency regions.

The pressing method is not limited. Examples of the pressing method include a pressing using a die and a mold pressing. There is no limit to the type of the binder. Examples of the binder include a silicone resin. There is no limit to a mixture ratio between the soft magnetic alloy powder and the binder either. For example, 1 to 10 mass % of the binder is mixed with 100 mass % of the soft magnetic alloy powder.

For example, 100 mass % of the soft magnetic alloy powder is mixed with 1 to 5 mass % of a binder and compressively pressed using a die, and it is thereby possible to obtain a magnetic core having a space factor (powder filling rate) of 70% or more, a magnetic flux density of 0.4 T or more at the time of applying the magnetic field ($1.6\times10^4$ A/m), and a resistivity of 1Ω ·cm or more. These properties are more excellent than those of normal ferrite magnetic cores.

For example, 100 mass % of the soft magnetic alloy powder is mixed with 1 to 3 mass % of a binder and compressively pressed using a die under a temperature condition that is equal to or higher than a softening point of the binder, and it is thereby possible to obtain a dust core having a space factor of 80% or more, a magnetic flux density of 0.9 T or more at the time of applying the magnetic field ($1.6\times10^4$ A/m), and a resistivity of 0.1Ω ·cm or more. These properties are more excellent than those of normal dust cores.

Moreover, a green compact constituting the above-mentioned magnetic core undergoes a heat treatment after the pressing for distortion removal. This further reduces core loss and improves usefulness.

An inductance product is obtained by winding a wire around the above-mentioned magnetic core. The wire is wound by any method, and the inductance product is manufactured by any method. For example, a wire is wound around a magnetic core manufactured by the above-mentioned method at least in one or more turns.

Moreover, when soft magnetic alloy grains are used, there is a method of manufacturing an inductance product by pressing and integrating a magnetic material incorporating a wire coil. In this case, an inductance product corresponding to high frequencies and large electric current is obtained easily.

Moreover, when soft magnetic alloy grains are used, an inductance product can be obtained by carrying out firing after alternately printing and laminating a soft magnetic alloy paste obtained by pasting the soft magnetic alloy grains added with a binder and a solvent and a conductor paste obtained by pasting a conductor metal for coils added with a binder and a solvent. Instead, an inductance product where a coil is incorporated into a magnetic material can be obtained by preparing a soft magnetic alloy sheet using a soft magnetic alloy paste, printing a conductor paste on the surface of the soft magnetic alloy sheet, and laminating and firing them.

Here, when an inductance product is manufactured using soft magnetic alloy grains, in view of obtaining excellent Q properties, it is preferred to use a soft magnetic alloy powder whose maximum grain size is 45 μm or less by sieve diameter and center grain size (D50) is 30 μm or less. In order to have a maximum grain size of 45 μm or less by sieve diameter, only a soft magnetic alloy powder that passes through a sieve whose mesh size is 45 μm may be used.

The larger a maximum grain size of a soft magnetic alloy powder is, the further Q values in high-frequency regions tend to decrease. In particular, when using a soft magnetic alloy powder whose maximum grain diameter is larger than 45 μm by sieve diameter, Q values in high-frequency regions may decrease greatly. When Q values in high-frequency regions are not so important, however, a soft magnetic alloy powder having a large variation can be used. When a soft magnetic alloy powder having a large variation is used, cost can be reduced as it can be manufactured comparatively inexpensively.

The dust core according to the present embodiment is used for any purposes, and can favorably be used as magnetic cores for inductors (particularly for power inductors), for example.

EXAMPLES

Hereinafter, the present invention is specifically explained based on Examples.

Experimental Example 1

Various raw material metals were separately weighed so that a base alloy having a composition of Fe: 81.0 at %, Nb: 7.0 at %, P: 3.0 at %, and B: 9.0 at % would be obtained. Then, a chamber was evacuated, and the base alloy was thereafter manufactured by melting the raw material metals using high-frequency heating.

After that, the manufactured base alloy was heated, melted, and turned into a molten metal at 1250° C., and the molten metal was sprayed against a roller by single roller method (roller temperature: 70° C., vapor pressure in chamber: 4 hPa, and temperature in chamber: 30° C.), whereby ribbons were manufactured. The thicknesses of the ribbons were set to 20 μm by appropriately controlling the number of rotation of the roller. The vapor pressure was controlled by using an Ar gas whose dew-point was adjusted.

Next, the manufactured ribbons underwent a heat treatment, and single plate-like samples were obtained. In the present experimental example, the heat treatment was carried out twice in samples other than Sample No. 6 to Sample No. 10. Heat-treatment conditions are shown in Table 1. When the heat treatment was carried out for each of the ribbons, the ribbon was placed on a setter of a material shown in Table 1, and a thermocouple for control was placed under the setter. The thicknesses of the setters were all set to 1 mm. Incidentally, an alumina whose thermal conductivity was 31 W/m and specific heat was 779 J/kg was used, a carbon whose thermal conductivity was 150 W/m and specific heat was 691 J/kg was used, and a SiC (silicon carbide) whose thermal conductivity was 180 W/m and specific heat was 740 J/kg was used.

Each ribbon before the heat treatment was partially pulverized, turned into a powder, underwent an X-ray diffraction measurement, and whether crystals existed was confirmed. Moreover, whether crystals and microcrystals existed was confirmed by observing a selected area electron diffraction image and a bright visual image with a magnification of 300,000 times using a transmission electron microscope. As a result, it was confirmed that the ribbons of Examples and Comparative Examples did not contain crystals having a grain size of 20 nm or more and were amorphous. Incidentally, a ribbon failing to contain crystals having a grain size of 20 nm or more and containing only initial fine crystals having a grain size of less than 20 nm was also considered to be amorphous. Incidentally, an ICP measurement and an X-ray fluorescence measurement confirmed that the composition of the entire sample substantially corresponded to the composition of the base alloy.

Each sample after the ribbon underwent the heat treatment was measured in terms of saturation magnetic flux density and coercivity. Table 1 shows the results. The saturation magnetic flux density (Bs) was measured in the magnetic field (1000 kA/m) using a vibrating sample type magnetometer (VSM). The coercivity (Hc) was measured in the magnetic field (5 kA/m) using a DC BH tracer. The resistivity (p) was measured by four probe method. As a result of the X-ray diffraction measurement for each sample after the ribbon underwent the heat treatment, Fe based nanocrystallines of each ribbon after the heat treatment had an average grain size of 5 to 30 nm in all Examples of each Experimental Example other than Experimental Example 7 mentioned below.

In all Experimental Examples (e.g., Experimental Example 1), a saturation magnetic flux density Bs of 1.00 T or more was considered to be good, and a coercivity Hc of less than 10.0 A/m was considered to be good. In the following tables, a resistivity of 110 μΩcm or more was represented by ⊚, a resistivity of 100 μΩcm or more and less than 110 μΩcm was represented by ○, and a resistivity of less than 100 μΩcm was represented by x. The evaluation was higher in the order of ⊚, ○, and x. The evaluation of ⊚ and ○ was considered to be good.

Moreover, a range (40 nm×40 nm×200 nm) of each sample was observed using a three-dimensional atom probe (3DAP). As a result, it was confirmed that all samples that had not contained crystals or microcrystals in the X-ray diffraction measurement contained Fe-poor phases and Fe-rich phases. It was also confirmed that the Fe-poor phases were amorphous, and that the Fe-rich phases were composed of nanocrystallines. Then, an average concentration of P in the Fe-poor phases and an average concentration of P in the Fe-rich phases were measured using the 3DAP. Table 1 shows the results.

| Sample No. | Example/ Comparative Example | setter | heat-treatment conditions: first time temperature (° C.) | first time time (h) | second time temperature (° C.) | second time time (h) | saturation magnetic flux density Bs (T) | coercivity Hc (A/m) | resistivity ρ | Fe-poor phase average concentration of P at % | Fe-rich phase average concentration of P at % | average concentration of P in Fe-poor phase/ average concentration of P in each alloy | average concentration of P in Fe-poor phase/ average concentration of P in Fe-rich phase |
|---|---|---|---|---|---|---|---|---|---|---|---|---|---|
| 1 | Comp. Ex. | alumina | 450 | 1 | 550 | 1 | 1.14 | 19 | X | 3.8 | 1.5 | 1.27 | 2.5 |
| 2 | Comp. Ex. | alumina | 450 | 1 | 575 | 1 | 1.19 | 14 | X | 3.9 | 1.5 | 1.30 | 2.6 |
| 3 | Comp. Ex. | alumina | 450 | 1 | 600 | 1 | 1.33 | 10 | X | 4.1 | 1.4 | 1.37 | 2.9 |
| 4 | Comp. Ex. | alumina | 450 | 1 | 625 | 1 | 1.36 | 17 | X | 4.2 | 1.4 | 1.40 | 3.0 |
| 6 | Comp. Ex. | carbon | — | — | 550 | 1 | 1.13 | 19 | X | 3.5 | 1.4 | 1.17 | 2.5 |
| 7 | Comp. Ex. | carbon | — | — | 575 | 1 | 1.16 | 14 | X | 3.7 | 1.4 | 1.23 | 2.6 |
| 8 | Comp. Ex. | carbon | — | — | 600 | 1 | 1.32 | 10 | X | 3.8 | 1.3 | 1.27 | 2.9 |
| 9 | Comp. Ex. | carbon | — | — | 625 | 1 | 1.34 | 17 | X | 3.9 | 1.4 | 1.30 | 2.8 |
| 10 | Comp. Ex. | carbon | — | — | 650 | 1 | 1.43 | 18 | X | 4.1 | 1.5 | 1.37 | 2.7 |
| 12a | Comp. Ex. | carbon | 450 | 1 | 525 | 1 | 1.14 | 21 | X | 3.1 | 1.3 | 1.03 | 2.4 |
| 12 | Ex. | carbon | 450 | 1 | 550 | 1 | 1.24 | 9.7 | ○ | 4.5 | 1.3 | 1.50 | 3.5 |
| 13 | Ex. | carbon | 450 | 1 | 575 | 1 | 1.41 | 7.5 | ○ | 4.8 | 1.2 | 1.60 | 4.0 |
| 14 | Ex. | carbon | 450 | 1 | 600 | 1 | 1.44 | 4.2 | ○ | 5.2 | 1.1 | 1.73 | 4.7 |
| 15 | Ex. | carbon | 450 | 1 | 625 | 1 | 1.43 | 3.1 | ○ | 5.8 | 0.8 | 1.93 | 7.3 |
| 16 | Ex. | carbon | 450 | 1 | 650 | 1 | 1.46 | 2.7 | ◎ | 6.3 | 0.7 | 2.10 | 9.0 |
| 17 | Ex. | carbon | 450 | 1 | 675 | 1 | 1.44 | 4.4 | ◎ | 6.7 | 0.6 | 2.23 | 11.2 |
| 19 | Comp. Ex. | carbon | 300 | 1 | 650 | 1 | 1.43 | 18 | X | 4.3 | 2.1 | 1.43 | 2.0 |
| 20 | Ex. | carbon | 350 | 1 | 650 | 1 | 1.43 | 8.7 | ○ | 4.5 | 1.3 | 1.50 | 3.5 |
| 21 | Ex. | carbon | 400 | 1 | 650 | 1 | 1.43 | 3.1 | ○ | 4.9 | 1.1 | 1.63 | 4.5 |
| 22 | Ex. | carbon | 500 | 1 | 650 | 1 | 1.43 | 3.1 | ○ | 5.1 | 0.8 | 1.70 | 6.4 |
| 23 | Ex. | carbon | 550 | 1 | 650 | 1 | 1.43 | 4.2 | ○ | 5.3 | 0.6 | 1.77 | 8.8 |
| 24 | Comp. Ex. | carbon | 600 | 1 | 650 | 1 | 1.27 | 16 | X | 4.1 | 1.5 | 1.37 | 2.7 |
| 25 | Ex. | carbon | 450 | 0.1 | 650 | 1 | 1.46 | 3.5 | ○ | 4.8 | 1.1 | 1.60 | 4.4 |
| 26 | Ex. | carbon | 450 | 0.5 | 650 | 1 | 1.44 | 3.4 | ○ | 5.0 | 0.8 | 1.67 | 6.3 |
| 16 | Ex. | carbon | 450 | 1 | 650 | 1 | 1.46 | 2.7 | ◎ | 6.3 | 0.7 | 2.10 | 9.0 |
| 27 | Ex. | carbon | 450 | 3 | 650 | 1 | 1.43 | 2.6 | ○ | 5.3 | 0.6 | 1.77 | 8.8 |
| 28 | Ex. | carbon | 450 | 10 | 650 | 1 | 1.44 | 2.3 | ○ | 5.4 | 0.6 | 1.80 | 9.0 |
| 29 | Ex. | carbon | 450 | 1 | 650 | 0.1 | 1.43 | 5.0 | ○ | 4.8 | 0.8 | 1.60 | 6.0 |
| 30 | Ex. | carbon | 450 | 1 | 650 | 0.5 | 1.46 | 3.6 | ○ | 5.4 | 0.7 | 1.80 | 7.7 |
| 16 | Ex. | carbon | 450 | 1 | 650 | 1 | 1.46 | 2.7 | ◎ | 6.3 | 0.7 | 2.10 | 9.0 |
| 31 | Ex. | carbon | 450 | 1 | 650 | 3 | 1.44 | 2.8 | ◎ | 7.3 | 0.6 | 2.43 | 12.2 |
| 32 | Ex. | carbon | 450 | 1 | 650 | 10 | 1.43 | 2.7 | ◎ | 8.4 | 0.6 | 2.80 | 14.0 |
| 33 | Ex. | SiC | 450 | 1 | 550 | 1 | 1.24 | 9.8 | ○ | 4.6 | 1.3 | 1.53 | 3.5 |
| 34 | Ex. | SiC | 450 | 1 | 575 | 1 | 1.41 | 7.7 | ○ | 4.9 | 1.2 | 1.63 | 4.1 |
| 35 | Ex. | SiC | 450 | 1 | 600 | 1 | 1.44 | 5.4 | ○ | 5.3 | 1.1 | 1.77 | 4.8 |
| 36 | Ex. | SiC | 450 | 1 | 625 | 1 | 1.43 | 2.1 | ○ | 5.8 | 0.8 | 1.93 | 7.3 |
| 37 | Ex. | SiC | 450 | 1 | 650 | 1 | 1.46 | 2.4 | ◎ | 6.7 | 0.7 | 2.23 | 9.6 |
| 38 | Ex. | SiC | 450 | 1 | 675 | 1 | 1.44 | 3.7 | ◎ | 8.4 | 0.6 | 2.80 | 14.0 |

Table 1 shows that the average concentration of P in the Fe-poor phases was higher than the average concentration of P in the entire soft magnetic alloy in Examples where the setter was made of the carbon or the SiC having the comparatively high thermal conductivity and the comparatively low specific heat, the heat treatment was carried out by two steps, and the first and second heat-treatment temperatures were controlled appropriately. These Examples had a good saturation magnetic flux density Bs, a good coercivity Hc, and a good resistivity ρ. On the other hand, coercivity Hc and/or resistivity ρ was/were bad in all of Sample No. 1 to Sample No. 5 (the setter was made of the alumina having the comparatively low thermal conductivity and the comparatively high specific heat), Sample No. 6 to Sample No. 11 (the heat treatment was carried out by one step), Sample No. 19 (the temperature of the first heat treatment was too low), and Sample No. 24 (the temperature of the first heat treatment was too high).

Experimental Example 2

In Experimental Example 2, the composition of the base alloy was changed to the composition shown in Table 2 (the above-mentioned composition (2) or a composition close thereto). The heat treatment was carried out in the same conditions as Sample No. 16 of Table 1. Specifically, the setter was made of carbon, the temperature of the first heat treatment was 450° C., the time of the first heat treatment was 1 hour, the temperature of the second heat treatment was 650° C., and the time of the second heat treatment was 1 hour.

Moreover, various measurements were carried out for all Examples and Comparative Examples in a similar manner to Experimental Example 1. As a result of the X-ray diffraction measurement, the entire soft magnetic alloy had a uniform concentration of Fe and did not contain Fe-poor phases or Fe-rich phases in Comparative Examples containing crystals. In Experimental Example 2, a saturation magnetic flux density Bs of 1.30 T or more was considered to be better, a saturation magnetic flux density Bs of 1.40 T or more was considered to be particularly better, and a coercivity Hc of 4.0 A/m or less was considered to be particularly better. Table 3 shows the results.

TABLE 2

| | | Fe(1 − (a + b + c + d + e))CuaM1bPcM2dSie (α = 0) | | | | | | | |
|---|---|---|---|---|---|---|---|---|---|
| | Comparative | | | M1 | | M2 | | | |
| Sample No. | Example/ Example | Fe | Cu a | (Nb) b | P c | B | C | B + C d | Si e |
| 40a | Comp. Ex. | 0.839 | 0.000 | 0.070 | 0.000 | 0.090 | 0.000 | 0.090 | 0.000 |
| 40 | Ex. | 0.839 | 0.000 | 0.070 | 0.001 | 0.090 | 0.000 | 0.090 | 0.000 |
| 41 | Ex. | 0.835 | 0.000 | 0.070 | 0.005 | 0.090 | 0.000 | 0.090 | 0.000 |
| 42 | Ex. | 0.830 | 0.000 | 0.070 | 0.010 | 0.090 | 0.000 | 0.090 | 0.000 |
| 16 | Ex. | 0.810 | 0.000 | 0.070 | 0.030 | 0.090 | 0.000 | 0.090 | 0.000 |
| 43 | Ex. | 0.790 | 0.000 | 0.070 | 0.050 | 0.090 | 0.000 | 0.090 | 0.000 |
| 44 | Ex. | 0.770 | 0.000 | 0.070 | 0.070 | 0.090 | 0.000 | 0.090 | 0.000 |
| 45 | Ex. | 0.740 | 0.000 | 0.070 | 0.100 | 0.090 | 0.000 | 0.090 | 0.000 |
| 46 | Ex. | 0.690 | 0.000 | 0.070 | 0.150 | 0.090 | 0.000 | 0.090 | 0.000 |
| 47 | Ex. | 0.680 | 0.000 | 0.070 | 0.160 | 0.090 | 0.000 | 0.090 | 0.000 |
| 48 | Comp. Ex. | 0.845 | 0.000 | 0.015 | 0.050 | 0.090 | 0.000 | 0.090 | 0.000 |
| 49 | Ex. | 0.840 | 0.000 | 0.020 | 0.050 | 0.090 | 0.000 | 0.090 | 0.000 |
| 50 | Ex. | 0.820 | 0.000 | 0.040 | 0.050 | 0.090 | 0.000 | 0.090 | 0.000 |
| 51 | Ex. | 0.810 | 0.000 | 0.050 | 0.050 | 0.090 | 0.000 | 0.090 | 0.000 |
| 43 | Ex. | 0.790 | 0.000 | 0.070 | 0.050 | 0.090 | 0.000 | 0.090 | 0.000 |
| 52 | Ex. | 0.780 | 0.000 | 0.080 | 0.050 | 0.090 | 0.000 | 0.090 | 0.000 |
| 53 | Ex. | 0.760 | 0.000 | 0.100 | 0.050 | 0.090 | 0.000 | 0.090 | 0.000 |
| 54 | Ex. | 0.740 | 0.000 | 0.120 | 0.050 | 0.090 | 0.000 | 0.090 | 0.000 |
| 55 | Ex. | 0.710 | 0.000 | 0.150 | 0.050 | 0.090 | 0.000 | 0.090 | 0.000 |
| 56 | Ex. | 0.700 | 0.000 | 0.160 | 0.050 | 0.090 | 0.000 | 0.090 | 0.000 |
| 57 | Comp. Ex. | 0.870 | 0.000 | 0.060 | 0.050 | 0.020 | 0.000 | 0.020 | 0.000 |
| 58 | Ex. | 0.865 | 0.000 | 0.060 | 0.050 | 0.025 | 0.000 | 0.025 | 0.000 |
| 59 | Ex. | 0.830 | 0.000 | 0.060 | 0.050 | 0.060 | 0.000 | 0.060 | 0.000 |
| 60 | Ex. | 0.810 | 0.000 | 0.060 | 0.050 | 0.080 | 0.000 | 0.080 | 0.000 |
| 61 | Ex. | 0.770 | 0.000 | 0.060 | 0.050 | 0.120 | 0.000 | 0.120 | 0.000 |
| 62 | Ex. | 0.740 | 0.000 | 0.060 | 0.050 | 0.150 | 0.000 | 0.150 | 0.000 |
| 63 | Ex. | 0.690 | 0.000 | 0.060 | 0.050 | 0.200 | 0.000 | 0.200 | 0.000 |
| 64 | Ex. | 0.680 | 0.000 | 0.060 | 0.050 | 0.210 | 0.000 | 0.210 | 0.000 |
| 65 | Ex. | 0.800 | 0.000 | 0.060 | 0.050 | 0.000 | 0.090 | 0.090 | 0.000 |
| 66 | Ex. | 0.740 | 0.000 | 0.060 | 0.050 | 0.000 | 0.150 | 0.150 | 0.000 |
| 67 | Ex. | 0.690 | 0.000 | 0.060 | 0.050 | 0.000 | 0.200 | 0.200 | 0.000 |
| 68 | Ex. | 0.799 | 0.000 | 0.060 | 0.050 | 0.090 | 0.001 | 0.091 | 0.000 |
| 69 | Ex. | 0.795 | 0.000 | 0.060 | 0.050 | 0.090 | 0.005 | 0.095 | 0.000 |
| 70 | Ex. | 0.790 | 0.000 | 0.060 | 0.050 | 0.090 | 0.010 | 0.100 | 0.000 |
| 71 | Ex. | 0.770 | 0.000 | 0.060 | 0.050 | 0.090 | 0.030 | 0.120 | 0.000 |
| 72 | Ex. | 0.795 | 0.000 | 0.060 | 0.050 | 0.090 | 0.000 | 0.090 | 0.005 |
| 73 | Ex. | 0.790 | 0.000 | 0.060 | 0.050 | 0.090 | 0.000 | 0.090 | 0.010 |
| 74 | Ex. | 0.780 | 0.000 | 0.060 | 0.050 | 0.090 | 0.000 | 0.090 | 0.020 |
| 75 | Ex. | 0.770 | 0.000 | 0.060 | 0.050 | 0.090 | 0.000 | 0.090 | 0.030 |
| 76 | Ex. | 0.740 | 0.000 | 0.060 | 0.050 | 0.090 | 0.000 | 0.090 | 0.060 |
| 77 | Ex. | 0.730 | 0.000 | 0.060 | 0.050 | 0.090 | 0.000 | 0.090 | 0.070 |
| 16 | Ex. | 0.810 | 0.000 | 0.070 | 0.030 | 0.090 | 0.000 | 0.090 | 0.000 |
| 78 | Ex. | 0.809 | 0.001 | 0.070 | 0.030 | 0.090 | 0.000 | 0.090 | 0.000 |
| 79 | Ex. | 0.805 | 0.005 | 0.070 | 0.030 | 0.090 | 0.000 | 0.090 | 0.000 |

TABLE 2-continued

| Sample No. | Comparative Example/ Example | Fe(1 − (a + b + c + d + e))CuaM1bPcM2dSie (α = 0) Fe | Cu a | M1 (Nb) b | P c | M2 B | C | B + C d | Si e |
|---|---|---|---|---|---|---|---|---|---|
| 80 | Ex. | 0.800 | 0.010 | 0.070 | 0.030 | 0.090 | 0.000 | 0.090 | 0.000 |
| 81 | Ex. | 0.780 | 0.030 | 0.070 | 0.030 | 0.090 | 0.000 | 0.090 | 0.000 |
| 82 | Comp. Ex. | 0.770 | 0.040 | 0.070 | 0.030 | 0.090 | 0.000 | 0.090 | 0.000 |

TABLE 3

| Sample No. | Comparative Example/ Example | XRD | saturation magnetic flux density Bs (T) | coercivity Hc (A/m) | resistivity ρ | Fe-poor phase average concentration of P at % | Fe-rich phase average concentration of P at % | average concentration of P in Fe-poor phase/average concentration of P in each alloy | average concentration of P in Fe-poor phase/average concentration of P in Fe-rich phase |
|---|---|---|---|---|---|---|---|---|---|
| 40a | Comp. Ex. | amorphous | 1.52 | 4.8 | X | 0.0 | 0.0 | — | — |
| 40 | Ex. | amorphous | 1.52 | 2.9 | ○ | 1.1 | 0.1 | 11.00 | 11.0 |
| 41 | Ex. | amorphous | 1.51 | 2.8 | ○ | 1.3 | 0.1 | 2.60 | 13.0 |
| 42 | Ex. | amorphous | 1.49 | 2.7 | ◎ | 2.8 | 0.4 | 2.80 | 7.0 |
| 16 | Ex. | amorphous | 1.46 | 2.7 | ◎ | 6.3 | 1.1 | 2.10 | 5.7 |
| 43 | Ex. | amorphous | 1.51 | 1.8 | ◎ | 10.3 | 1.2 | 2.06 | 8.6 |
| 44 | Ex. | amorphous | 1.50 | 1.8 | ◎ | 23.5 | 1.5 | 3.36 | 15.7 |
| 45 | Ex. | amorphous | 1.44 | 2.5 | ◎ | 30.2 | 1.3 | 3.02 | 23.2 |
| 46 | Ex. | amorphous | 1.37 | 2.7 | ◎ | 43.1 | 1.6 | 2.87 | 26.9 |
| 47 | Ex. | amorphous | 1.28 | 2.8 | ◎ | 51.2 | 2.1 | 3.20 | 24.4 |
| 48 | Comp. Ex. | crystalline | 1.60 | 385 | X | | no Fe-poor phase | | |
| 49 | Ex. | amorphous | 1.57 | 2.7 | ◎ | 10.4 | 1.3 | 2.08 | 8.0 |
| 50 | Ex. | amorphous | 1.55 | 2.3 | ◎ | 10.4 | 1.2 | 2.08 | 8.7 |
| 51 | Ex. | amorphous | 1.51 | 1.6 | ◎ | 10.3 | 1.1 | 2.06 | 9.4 |
| 43 | Ex. | amorphous | 1.51 | 1.8 | ◎ | 10.3 | 1.2 | 2.06 | 8.6 |
| 52 | Ex. | amorphous | 1.45 | 1.6 | ◎ | 10.3 | 1.2 | 2.06 | 8.6 |
| 53 | Ex. | amorphous | 1.43 | 2.1 | ◎ | 10.2 | 1.2 | 2.04 | 8.5 |
| 54 | Ex. | amorphous | 1.41 | 2.5 | ◎ | 9.8 | 1.3 | 1.96 | 7.5 |
| 55 | Ex. | amorphous | 1.31 | 2.5 | ◎ | 9.4 | 1.2 | 1.88 | 7.8 |
| 56 | Ex. | amorphous | 1.24 | 2.8 | ◎ | 9.5 | 1.2 | 1.90 | 7.9 |
| 57 | Comp. Ex. | crystalline | 1.60 | 217 | X | | no Fe-poor phase | | |
| 58 | Ex. | amorphous | 1.62 | 2.6 | ◎ | 10.4 | 1.2 | 2.08 | 8.7 |
| 59 | Ex. | amorphous | 1.57 | 2.1 | ◎ | 10.4 | 1.3 | 2.08 | 8.0 |
| 60 | Ex. | amorphous | 1.56 | 1.8 | ◎ | 10.3 | 1.4 | 2.06 | 7.4 |
| 61 | Ex. | amorphous | 1.45 | 2.0 | ◎ | 10.3 | 1.3 | 2.06 | 7.9 |
| 62 | Ex. | amorphous | 1.40 | 2.5 | ◎ | 9.9 | 1.3 | 1.98 | 7.6 |
| 63 | Ex. | amorphous | 1.35 | 2.7 | ◎ | 9.7 | 1.3 | 1.94 | 7.5 |
| 64 | Ex. | amorphous | 1.20 | 2.9 | ◎ | 9.8 | 1.2 | 1.96 | 8.2 |
| 65 | Ex. | amorphous | 1.43 | 2.8 | ◎ | 9.9 | 1.4 | 1.98 | 7.1 |
| 66 | Ex. | amorphous | 1.35 | 2.6 | ◎ | 9.7 | 1.3 | 1.94 | 7.5 |
| 67 | Ex. | amorphous | 1.31 | 2.5 | ◎ | 9.8 | 1.2 | 1.96 | 8.2 |
| 68 | Ex. | amorphous | 1.51 | 1.4 | ◎ | 9.9 | 1.3 | 1.98 | 7.6 |
| 69 | Ex. | amorphous | 1.51 | 1.2 | ◎ | 9.8 | 1.2 | 1.96 | 8.2 |
| 70 | Ex. | amorphous | 1.50 | 1.5 | ◎ | 9.8 | 1.3 | 1.96 | 7.5 |
| 71 | Ex. | amorphous | 1.48 | 1.7 | ◎ | 10.1 | 1.4 | 2.02 | 7.2 |
| 72 | Ex. | amorphous | 1.53 | 1.7 | ◎ | 10.2 | 1.5 | 2.04 | 6.8 |
| 73 | Ex. | amorphous | 1.52 | 1.6 | ◎ | 10.2 | 1.3 | 2.04 | 7.8 |
| 74 | Ex. | amorphous | 1.50 | 1.6 | ◎ | 10.3 | 1.3 | 2.06 | 7.9 |
| 75 | Ex. | amorphous | 1.46 | 2.1 | ◎ | 10.2 | 1.3 | 2.04 | 7.8 |
| 76 | Ex. | amorphous | 1.42 | 2.3 | ◎ | 10.2 | 1.4 | 2.04 | 7.3 |
| 77 | Ex. | amorphous | 1.40 | 2.4 | ◎ | 10.3 | 1.3 | 2.06 | 7.9 |
| 16 | Ex. | amorphous | 1.46 | 2.7 | ◎ | 6.3 | 1.1 | 2.10 | 5.7 |
| 78 | Ex. | amorphous | 1.52 | 1.6 | ◎ | 6.5 | 0.9 | 2.17 | 7.2 |
| 79 | Ex. | amorphous | 1.52 | 1.7 | ◎ | 6.2 | 1.2 | 2.07 | 5.2 |
| 80 | Ex. | amorphous | 1.52 | 1.5 | ◎ | 6.3 | 1.2 | 2.10 | 5.3 |
| 81 | Ex. | amorphous | 1.54 | 1.6 | ◎ | 5.8 | 1.3 | 1.93 | 4.5 |
| 82 | Comp. Ex. | crystalline | 1.53 | 356 | ◎ | | no Fe-poor phase | | |

Table 2 and Table 3 show that the saturation magnetic flux density Bs, the coercivity Hc, and the resistivity ρ were good in Examples where an average concentration of P in the Fe-poor phases was higher than an average concentration of P in the entire soft magnetic alloy. In particular, the saturation magnetic flux density Bs and the coercivity Hc were particularly better in Examples where the composition of the entire alloy was within the ranges of the above-mentioned composition (1) and the above-mentioned composition (2).

On the other hand, the coercivity He was significantly high in Comparative Examples containing no Fe-poor phases. In particular, the resistivity ρ was also decreased in Sample No. 48 and Sample No. 57.

In Sample No. 40a (the soft magnetic alloy did not contain P), the resistivity ρ was decreased, and the coercivity He was increased compared to Examples of Table 2 and Table 3.

Experimental Example 3

In Experimental Example 3, the composition of the base alloy was changed to the composition shown in Table 4 (the above-mentioned composition (3) or a composition close thereto). The heat treatment was carried out in the same conditions as Sample No. 16 of Table 1. Specifically, the setter was made of carbon, the temperature of the first heat treatment was 450° C., the time of the first heat treatment was 1 hour, the temperature of the second heat treatment was 650° C., and the time of the second heat treatment was 1 hour.

Moreover, various measurements were carried out for all Examples and Comparative Examples in a similar manner to Experimental Example 1. As a result of the X-ray diffraction measurement, all Examples and Comparative Examples were amorphous and contained Fe-poor phases and Fe-rich phases. In Sample No. 83, however, P did not exist, and the P concentration was thereby zero in the Fe-poor phases, the Fe-rich phases, and the entire soft magnetic alloy. In Experimental Example 3, a saturation magnetic flux density Bs of 1.00 T or more was considered to be better, and a saturation magnetic flux density Bs of 1.10 T or more was considered to be particularly better. In Experimental Example 3, a coercivity Hc of 1.0 A/m or less was considered to be better, and a coercivity Hc of 0.5 A/m or less was considered to be particularly better. Based on Sample No. 83 (Comparative Example failing to contain P), a resistivity of 130 μΩcm or more was represented by ⊚, a resistivity of more than the resistivity of Sample No. 83 and less than 130 μΩcm was represented by ⊚, and a resistivity of the resistivity of Sample No. 83 or less was represented by x. The evaluation was higher in the order of ⊚, ○, and x. The evaluation of ⊚ and ○ was considered to be good. Incidentally, the resistivity of Sample No. 83 was less than 100 μΩcm, and the resistivity of Sample No. 84 was 100μΩcm or more. Table 5 shows the results.

TABLE 4

| | | Fe(1 − (a + b + c + d + e))CuaM1bPcM2dSie (α = 0) | | | | | | | |
|---|---|---|---|---|---|---|---|---|---|
| Sample No. | Comparative Example/ Example | Fe | Cu a | M1 (Nb) b | P c | M2 B | C | B + C d | Si e |
| 83 | Comp. Ex. | 0.735 | 0.010 | 0.030 | 0.000 | 0.090 | 0.000 | 0.090 | 0.135 |
| 84 | Ex. | 0.734 | 0.010 | 0.030 | 0.001 | 0.090 | 0.000 | 0.090 | 0.135 |
| 85 | Ex. | 0.730 | 0.010 | 0.030 | 0.005 | 0.090 | 0.000 | 0.090 | 0.135 |
| 86 | Ex. | 0.725 | 0.010 | 0.030 | 0.010 | 0.090 | 0.000 | 0.090 | 0.135 |
| 87 | Ex. | 0.685 | 0.010 | 0.030 | 0.050 | 0.090 | 0.000 | 0.090 | 0.135 |
| 88 | Ex. | 0.665 | 0.010 | 0.030 | 0.070 | 0.090 | 0.000 | 0.090 | 0.135 |
| 89 | Ex. | 0.790 | 0.010 | 0.030 | 0.010 | 0.090 | 0.000 | 0.090 | 0.070 |
| 90 | Ex. | 0.760 | 0.010 | 0.030 | 0.010 | 0.090 | 0.000 | 0.090 | 0.100 |
| 86 | Ex. | 0.725 | 0.010 | 0.030 | 0.010 | 0.090 | 0.000 | 0.090 | 0.135 |
| 91 | Ex. | 0.705 | 0.010 | 0.030 | 0.010 | 0.090 | 0.000 | 0.090 | 0.155 |
| 92 | Ex. | 0.685 | 0.010 | 0.030 | 0.010 | 0.090 | 0.000 | 0.090 | 0.175 |
| 93 | Ex. | 0.745 | 0.010 | 0.010 | 0.010 | 0.090 | 0.000 | 0.090 | 0.135 |
| 86 | Ex. | 0.725 | 0.010 | 0.030 | 0.010 | 0.090 | 0.000 | 0.090 | 0.135 |
| 94 | Ex. | 0.705 | 0.010 | 0.050 | 0.010 | 0.090 | 0.000 | 0.090 | 0.135 |
| 95 | Ex. | 0.655 | 0.010 | 0.100 | 0.010 | 0.090 | 0.000 | 0.090 | 0.135 |
| 96 | Ex. | 0.795 | 0.010 | 0.030 | 0.010 | 0.020 | 0.000 | 0.020 | 0.135 |
| 97 | Ex. | 0.765 | 0.010 | 0.030 | 0.010 | 0.050 | 0.000 | 0.050 | 0.135 |
| 86 | Ex. | 0.725 | 0.010 | 0.030 | 0.010 | 0.090 | 0.000 | 0.090 | 0.135 |
| 98 | Ex. | 0.715 | 0.010 | 0.030 | 0.010 | 0.100 | 0.000 | 0.100 | 0.135 |
| 86 | Ex. | 0.725 | 0.010 | 0.030 | 0.010 | 0.090 | 0.000 | 0.090 | 0.135 |
| 99 | Ex. | 0.724 | 0.010 | 0.030 | 0.010 | 0.090 | 0.001 | 0.091 | 0.135 |
| 100 | Ex. | 0.720 | 0.010 | 0.030 | 0.010 | 0.090 | 0.005 | 0.095 | 0.135 |
| 101 | Ex. | 0.715 | 0.010 | 0.030 | 0.010 | 0.090 | 0.010 | 0.100 | 0.135 |
| 102 | Ex. | 0.705 | 0.010 | 0.030 | 0.010 | 0.090 | 0.020 | 0.110 | 0.135 |
| 103 | Ex. | 0.695 | 0.010 | 0.030 | 0.010 | 0.090 | 0.030 | 0.120 | 0.135 |
| 104 | Ex. | 0.675 | 0.010 | 0.030 | 0.010 | 0.090 | 0.050 | 0.140 | 0.135 |

TABLE 5

| | | Fe(1 − (a + b + c + d + e))CuaM1bPcM2dSie (α = 0) | | | | | | |
|---|---|---|---|---|---|---|---|---|
| Sample No. | Comparative Example/ Example | saturation magnetic flux density Bs (T) | coercivity Hc (A/m) | resistivity ρ | Fe-poor phase average concentration of P at % | Fe-rich phase average concentration of P at % | average concentration of P in Fe-poor phase/ average concentration of P in each alloy | average concentration of P in Fe-poor phase/ average concentration of P in Fe-rich phase |
| 83 | Comp. Ex. | 1.21 | 0.5 | X | 0.0 | 0.0 | — | — |
| 84 | Ex. | 1.21 | 0.4 | ○ | 1.2 | 0.1 | 12.00 | 12.0 |
| 85 | Ex. | 1.19 | 0.4 | ⊚ | 2.1 | 0.1 | 4.20 | 21.0 |
| 86 | Ex. | 1.18 | 0.3 | ⊚ | 3.4 | 0.2 | 3.40 | 17.0 |
| 87 | Ex. | 1.14 | 0.4 | ⊚ | 14.2 | 0.7 | 2.84 | 20.3 |
| 88 | Ex. | 1.09 | 0.4 | ⊚ | 25.1 | 1.5 | 3.59 | 16.7 |
| 89 | Ex. | 1.31 | 0.6 | ⊚ | 3.4 | 0.2 | 3.40 | 17.0 |

TABLE 5-continued

| | | Fe(1 − (a + b + c + d + e))CuaM1bPcM2dSie (α = 0) | | | | | | |
|---|---|---|---|---|---|---|---|---|
| Sample No. | Comparative Example/ Example | saturation magnetic flux density Bs (T) | coercivity Hc (A/m) | resistivity ρ | Fe-poor phase average concentration of P at % | Fe-rich phase average concentration of P at % | average concentration of P in Fe-poor phase/ average concentration of P in each alloy | average concentration of P in Fe-poor phase/ average concentration of P in Fe-rich phase |
| 90 | Ex. | 1.21 | 0.5 | ◎ | 3.1 | 0.3 | 3.10 | 10.3 |
| 86 | Ex. | 1.18 | 0.3 | ◎ | 3.4 | 0.2 | 3.40 | 17.0 |
| 91 | Ex. | 1.18 | 0.3 | ◎ | 3.2 | 0.3 | 3.20 | 10.7 |
| 92 | Ex. | 1.10 | 0.2 | ◎ | 3.1 | 0.2 | 3.10 | 15.5 |
| 93 | Ex. | 1.15 | 0.4 | ◎ | 3.3 | 0.2 | 3.30 | 16.5 |
| 86 | Ex. | 1.18 | 0.3 | ◎ | 3.4 | 0.2 | 3.40 | 17.0 |
| 94 | Ex. | 1.14 | 0.3 | ◎ | 3.2 | 0.3 | 3.20 | 10.7 |
| 95 | Ex. | 1.05 | 0.3 | ◎ | 3.4 | 0.4 | 3.40 | 8.5 |
| 96 | Ex. | 1.34 | 0.7 | ◎ | 3.4 | 0.3 | 3.40 | 11.3 |
| 86 | Ex. | 1.18 | 0.3 | ◎ | 3.4 | 0.2 | 3.40 | 17.0 |
| 97 | Ex. | 1.25 | 0.6 | ◎ | 3.4 | 0.2 | 3.40 | 17.0 |
| 98 | Ex. | 1.10 | 0.4 | ◎ | 3.2 | 0.2 | 3.20 | 16.0 |
| 86 | Ex. | 1.18 | 0.3 | ◎ | 3.4 | 0.2 | 3.40 | 17.0 |
| 99 | Ex. | 1.18 | 0.2 | ◎ | 3.2 | 0.1 | 3.20 | 32.0 |
| 100 | Ex. | 1.16 | 0.2 | ◎ | 3.2 | 0.3 | 3.20 | 10.7 |
| 101 | Ex. | 1.12 | 0.2 | ◎ | 3.1 | 0.3 | 3.10 | 10.3 |
| 102 | Ex. | 1.10 | 0.3 | ◎ | 3.2 | 0.2 | 3.20 | 16.0 |
| 103 | Ex. | 1.06 | 0.3 | ◎ | 3.4 | 0.2 | 3.40 | 17.0 |
| 104 | Ex. | 1.03 | 0.3 | ◎ | 3.3 | 0.2 | 3.30 | 16.5 |

Table 4 and Table 5 show that the saturation magnetic flux density Bs, the coercivity Hc, and the resistivity ρ were good in Examples where an average concentration of P in the Fe-poor phases was higher than an average concentration of P in the entire soft magnetic alloy. In particular, the saturation magnetic flux density Bs and the coercivity Hc were particularly good in Examples where the composition of the entire alloy was within the ranges of the above-mentioned composition (1) and the above-mentioned composition (3).

On the other hand, the resistivity ρ was decreased in Sample No. 83, which did not contain P.

Experimental Example 4

In Experimental Example 4, the composition of the base alloy was changed to the composition shown in Table 6 (the above-mentioned composition (4) or a composition close thereto). The heat treatment was carried out in the same conditions as Sample No. 16 of Table 1. Specifically, the setter was made of carbon, the temperature of the first heat treatment was 450° C., the time of the first heat treatment was 1 hour, the temperature of the second heat treatment was 650° C., and the time of the second heat treatment was 1 hour.

Moreover, various measurements were carried out for all Examples and Comparative Examples in a similar manner to Experimental Example 1. As a result of the X-ray diffraction measurement, all Examples and Comparative Examples were amorphous, and all Examples contained Fe-poor phases and Fe-rich phases. In Experimental Example 4, a saturation magnetic flux density Bs of 1.40 T or more was considered to be better, and a saturation magnetic flux density Bs of 1.45 T or more was considered to be particularly better. In Experimental Example 4, a coercivity Hc of 7.0 A/m or less was considered to be better, and a coercivity Hc of 5.0 A/m or less was considered to be particularly better. Table 7 shows the results.

TABLE 6

| | | Fe(1 − (a + b + c + d + e))CuaM1bPcM2dSie (α = 0) | | | | | | | |
|---|---|---|---|---|---|---|---|---|---|
| | Comparative | | | M1 | | M2 | | | |
| Sample No. | Example/ Example | Fe | Cu a | (Nb) b | P c | B | C | B + C d | Si e |
| 104 | Ex. | 0.899 | 0.001 | 0.000 | 0.010 | 0.090 | 0.000 | 0.090 | 0.000 |
| 105 | Ex. | 0.889 | 0.001 | 0.000 | 0.010 | 0.090 | 0.000 | 0.090 | 0.010 |
| 106 | Ex. | 0.879 | 0.001 | 0.000 | 0.010 | 0.090 | 0.000 | 0.090 | 0.020 |
| 107 | Ex. | 0.849 | 0.001 | 0.000 | 0.010 | 0.090 | 0.000 | 0.090 | 0.050 |
| 108 | Ex. | 0.819 | 0.001 | 0.000 | 0.010 | 0.090 | 0.000 | 0.090 | 0.080 |
| 106 | Ex. | 0.879 | 0.001 | 0.000 | 0.010 | 0.090 | 0.000 | 0.090 | 0.020 |
| 109 | Ex. | 0.869 | 0.001 | 0.000 | 0.010 | 0.090 | 0.010 | 0.100 | 0.020 |
| 110 | Ex. | 0.849 | 0.001 | 0.000 | 0.010 | 0.090 | 0.030 | 0.120 | 0.020 |
| 111 | Ex. | 0.839 | 0.001 | 0.000 | 0.010 | 0.090 | 0.040 | 0.130 | 0.020 |
| 106 | Ex. | 0.879 | 0.001 | 0.000 | 0.010 | 0.090 | 0.000 | 0.090 | 0.020 |
| 112 | Ex. | 0.859 | 0.001 | 0.000 | 0.030 | 0.090 | 0.000 | 0.090 | 0.020 |
| 113 | Ex. | 0.839 | 0.001 | 0.000 | 0.050 | 0.090 | 0.000 | 0.090 | 0.020 |
| 114 | Ex. | 0.819 | 0.001 | 0.000 | 0.070 | 0.090 | 0.000 | 0.090 | 0.020 |
| 115 | Ex. | 0.789 | 0.001 | 0.000 | 0.100 | 0.090 | 0.000 | 0.090 | 0.020 |
| 116 | Ex. | 0.739 | 0.001 | 0.000 | 0.150 | 0.090 | 0.000 | 0.090 | 0.020 |

TABLE 7

| Sample No. | Comparative Example/ Example | Fe(1 − (a + b + c + d + e))CuaM1bPcM2dSie (α = 0) saturation magnetic flux density Bs (T) | coercivity Hc (A/m) | resistivity ρ | Fe-poor phase average concentration of P at % | Fe-rich phase average concentration of P at % | average concentration of P in Fe-poor phase/ average concentration of P in each alloy | average concentration of P in Fe-poor phase/ average concentration of P in Fe-rich phase |
|---|---|---|---|---|---|---|---|---|
| 104 | Ex. | 1.68 | 6.3 | ◎ | 3.5 | 0.2 | 3.50 | 17.5 |
| 105 | Ex. | 1.62 | 5.4 | ◎ | 3.4 | 0.3 | 3.40 | 11.3 |
| 106 | Ex. | 1.58 | 4.3 | ◎ | 3.2 | 0.3 | 3.20 | 10.7 |
| 107 | Ex. | 1.55 | 3.2 | ◎ | 3.3 | 0.3 | 3.30 | 11.0 |
| 108 | Ex. | 1.51 | 2.8 | ◎ | 3.5 | 0.3 | 3.50 | 11.7 |
| 106 | Ex. | 1.58 | 4.3 | ◎ | 3.2 | 0.3 | 3.20 | 10.7 |
| 109 | Ex. | 1.55 | 4.6 | ◎ | 3.3 | 0.2 | 3.30 | 16.5 |
| 110 | Ex. | 1.50 | 4.3 | ◎ | 3.2 | 0.2 | 3.20 | 16.0 |
| 111 | Ex. | 1.48 | 4.1 | ◎ | 3.3 | 0.3 | 3.30 | 11.0 |
| 106 | Ex. | 1.58 | 4.3 | ◎ | 3.2 | 0.3 | 3.20 | 10.7 |
| 112 | Ex. | 1.54 | 4.1 | ◎ | 6.3 | 0.3 | 2.10 | 21.0 |
| 113 | Ex. | 1.51 | 4.0 | ◎ | 10.3 | 0.4 | 2.06 | 25.8 |
| 114 | Ex. | 1.48 | 3.8 | ◎ | 23.5 | 1.2 | 3.36 | 19.6 |
| 115 | Ex. | 1.43 | 3.2 | ◎ | 30.2 | 1.5 | 3.02 | 20.1 |
| 116 | Ex. | 1.41 | 3.1 | ◎ | 43.1 | 1.3 | 2.87 | 33.2 |

Table 6 and Table 7 show that the saturation magnetic flux density Bs, the coercivity Hc, and the resistivity ρ were good in Examples where an average concentration of P in the Fe-poor phases was higher than an average concentration of P in the entire soft magnetic alloy. In particular, the saturation magnetic flux density Bs and the coercivity Hc were particularly good in Examples where the composition of the entire alloy was within the ranges of the above-mentioned composition (1) and the above-mentioned composition (4).

Experimental Example 5

Experimental Example 5 was carried out with the same conditions as Experimental Example 2 except that a part of Fe was substituted by X1 in Sample No. 16. As a result of the X-ray diffraction measurement, all Examples were amorphous and contained Fe-poor phases and Fe-rich phases. Table 8 shows the results.

Table 8 shows that the saturation magnetic flux density Bs, the coercivity Hc, and the resistivity ρ were good in Examples where an average concentration of P in the Fe-poor phases was higher than an average concentration of P in the entire soft magnetic alloy even if a part of Fe was substituted by X1.

Experimental Example 6

In Experimental Example 6, soft magnetic alloys of Sample No. 123 to Sample No. 135 were manufactured with the same conditions as Experimental Example 2 except that the M type was changed in Sample No. 50, soft magnetic alloys of Sample No. 136 to Sample No. 148 were manufactured with the same conditions as Experimental Example 2 except that the M type was changed in Sample No. 52 and that b was changed from 0.080 to 0.060, and soft magnetic alloys of Sample No. 149 to Sample No. 161 were manufactured with the same conditions as Experimental Example

TABLE 8

| | | Fe (1 − α) X1α (a to e are the same as those of Sample No. 16) | | | | | | | | |
|---|---|---|---|---|---|---|---|---|---|---|
| | | X1 | | | | | | | | |
| Sample No. | Example/ Comparative Example | type | a{1 − (a + b + c + d + e)} | saturation magnetic flux density Bs (T) | coercivity Hc (A/m) | resistivity ρ (μΩcm) | Fe-poor phase P concentration at % | Fe-rich phase P concentration at % | average concentration of P in Fe-poor phase/ average concentration of P in each alloy | average concentration of P in Fe-poor phase/ average concentration of P in Fe-rich phase |
| 16 | Ex. | — | 0.000 | 1.46 | 2.7 | ◎ | 6.3 | 0.7 | 2.10 | 9.0 |
| 117 | Ex. | Co | 0.010 | 1.47 | 2.8 | ◎ | 6.1 | 0.5 | 2.03 | 12.2 |
| 118 | Ex. | Co | 0.100 | 1.50 | 3.0 | ◎ | 6.2 | 0.4 | 2.07 | 15.5 |
| 119 | Ex. | Co | 0.400 | 1.55 | 3.4 | ◎ | 6.2 | 0.3 | 2.07 | 20.7 |
| 120 | Ex. | Ni | 0.010 | 1.44 | 2.5 | ◎ | 6.1 | 0.4 | 2.03 | 15.3 |
| 121 | Ex. | Ni | 0.100 | 1.43 | 2.3 | ◎ | 6.2 | 0.4 | 2.07 | 15.5 |
| 122 | Ex. | Ni | 0.400 | 1.40 | 1.8 | ◎ | 6.3 | 0.4 | 2.10 | 15.8 |

2 except that the M type was changed in Sample No. 54. Experimental Example 6 was evaluated in a similar manner to Experimental Example 2. As a result of the X-ray diffraction measurement, the entire soft magnetic alloy had a uniform concentration of Fe and did not contain Fe-poor phases or Fe-rich phases in Comparative Examples containing crystals. In Comparative Examples, resistivity ρ was not measured.

TABLE 9

Fe(1 − (a + b + c + d + e)) CuaM1bPcM2dSie (α = 0, a and c to e are the same as those of Sample No. 50)

| Sample No. | Comparative Example/ Example | M1 type | M1 b | XRD | saturation magnetic flux density Bs (T) | coercivity Hc (A/m) | resistivity ρ (μΩcm) |
|---|---|---|---|---|---|---|---|
| 50 | Ex. | Nb | 0.040 | amorphous | 1.55 | 2.3 | ◎ |
| 123 | Ex. | Hf | 0.040 | amorphous | 1.52 | 2.4 | ◎ |
| 124 | Ex. | Zr | 0.040 | amorphous | 1.54 | 2.3 | ◎ |
| 125 | Ex. | Ta | 0.040 | amorphous | 1.51 | 2.2 | ◎ |
| 126 | Ex. | Mo | 0.040 | amorphous | 1.52 | 2.3 | ◎ |
| 127 | Ex. | W | 0.040 | amorphous | 1.52 | 2.3 | ◎ |
| 128 | Ex. | Ti | 0.040 | amorphous | 1.50 | 2.3 | ◎ |
| 129 | Ex. | Al | 0.040 | amorphous | 1.48 | 2.5 | ◎ |
| 130 | Ex. | V | 0.040 | amorphous | 1.52 | 2.5 | ◎ |
| 131 | Ex. | Mn | 0.040 | amorphous | 1.46 | 2.6 | ◎ |
| 132 | Ex. | Cr | 0.040 | amorphous | 1.43 | 2.5 | ◎ |
| 132a | Ex. | S | 0.040 | amorphous | 1.51 | 2.5 | ◎ |
| 132b | Ex. | La | 0.040 | amorphous | 1.40 | 2.6 | ◎ |
| 132c | Ex. | Y | 0.040 | amorphous | 1.41 | 2.4 | ◎ |
| 133 | Ex. | $Nb_{0.5}Hf_{0.5}$ | 0.040 | amorphous | 1.55 | 2.3 | ◎ |
| 134 | Ex. | $Zr_{0.5}Ta_{0.5}$ | 0.040 | amorphous | 1.54 | 2.3 | ◎ |
| 135 | Ex. | $Nb_{0.4}Hf_{0.3}Zr_{0.3}$ | 0.040 | amorphous | 1.54 | 2.3 | ◎ |

Fe(1 − (a + b + c + d + e)) CuaM1bPcM2dSie (α = 0, a and c to e are the same as those of Sample No. 50)

| Sample No. | Fe-poor phase P concentration at % | Fe-rich phase P concentration at % | average concentration of P in Fe-poor phase/ average concentration of P in each alloy | average concentration of P in Fe-poor phase/ average concentration of P in Fe-rich phase |
|---|---|---|---|---|
| 50 | 10.4 | 1.2 | 2.08 | 8.7 |
| 123 | 10.3 | 1.3 | 2.06 | 7.9 |
| 124 | 10.3 | 1.4 | 2.06 | 7.4 |
| 125 | 10.4 | 1.3 | 2.08 | 8.0 |
| 126 | 10.1 | 1.2 | 2.02 | 8.4 |
| 127 | 10.2 | 1.2 | 2.04 | 8.5 |
| 128 | 9.8 | 1.4 | 1.96 | 7.0 |
| 129 | 9.9 | 1.0 | 1.98 | 9.9 |
| 130 | 10.1 | 1.2 | 2.02 | 8.4 |
| 131 | 10.2 | 1.5 | 2.04 | 6.8 |
| 132 | 10.2 | 1.2 | 2.04 | 8.5 |
| 132a | 10.2 | 1.2 | 2.04 | 8.5 |
| 132b | 10.1 | 1.3 | 2.02 | 7.8 |
| 132c | 10.4 | 1.4 | 2.08 | 7.4 |
| 133 | 10.2 | 1.3 | 2.04 | 7.8 |
| 134 | 10.4 | 1.2 | 2.08 | 8.7 |
| 135 | 10.2 | 1.2 | 2.04 | 8.5 |

Table 9 shows that the saturation magnetic flux density Bs, the coercivity Hc, and the resistivity ρ were good in Examples where an average concentration of P in the Fe-poor phases was higher than an average concentration of P in the entire soft magnetic alloy even if the type of M was changed. On the other hand, the coercivity Hc was significantly increased in Comparative Examples containing neither Fe-poor phases nor Fe-rich phases.

Experimental Example 7

Experimental Example 7 was carried out with the same conditions as Sample No. 16 except that the temperature of the molten metal and the heat-treatment conditions at the time of preparation of the ribbon were changed. Table 10 shows the test conditions. Table 10 also shows an average grain size of initial fine crystals before heat treatment and an average grain size of Fe based nanocrystallines after heat treatment. Incidentally, the ribbon before heat treatment was amorphous in all Examples. Table 11 shows the results evaluated in a similar manner to Experimental Example 2.

TABLE 10

| Sample No. | Comparative Example/ Example | temperature of molten metal (° C.) | average grain size of initial fine crystals (nm) | setter | heat-treatment conditions: first time temperature (° C.) | first time time (h) | second time temperature (° C.) | second time time (h) | average grain size of Fe based nanocrystallines (nm) |
|---|---|---|---|---|---|---|---|---|---|
| | | Same composition as Sample No. 16 | | | | | | | |
| 162 | Ex. | 1200 | no initial fine crystals | carbon | 450 | 1 | 650 | 1 | 10 |
| 163 | Ex. | 1225 | 0.1 | carbon | 450 | 1 | 550 | 1 | 3 |
| 164 | Ex. | 1250 | 0.3 | carbon | 450 | 1 | 550 | 3 | 5 |
| 165 | Ex. | 1250 | 0.3 | carbon | 450 | 1 | 600 | 1 | 10 |
| 16 | Ex. | 1250 | 0.3 | carbon | 450 | 1 | 650 | 1 | 13 |
| 167 | Ex. | 1275 | 10 | carbon | 450 | 1 | 600 | 1 | 12 |
| 168 | Ex. | 1275 | 10 | carbon | 450 | 1 | 650 | 1 | 30 |
| 169 | Ex. | 1300 | 15 | carbon | 450 | 1 | 600 | 1 | 17 |
| 170 | Ex. | 1300 | 15 | carbon | 450 | 1 | 650 | 10 | 50 |

TABLE 11

| Sample No. | Comparative Example/ Example | saturation magnetic flux density Bs (T) | coercivity Hc (A/m) | resistivity ρ | Fe-poor phase average concentration of P (at %) | Fe-rich phase average concentration of P (at %) | average concentration of P in Fe-poor phase/ average concentration of P in each alloy | average concentration of P in Fe-poor phase/ average concentration of P in Fe-rich phase |
|---|---|---|---|---|---|---|---|---|
| | | Same composition as Sample No. 16 | | | | | | |
| 162 | Ex. | 1.46 | 2.7 | ◎ | 6.3 | 0.7 | 2.10 | 9.0 |
| 163 | Ex. | 1.24 | 9.7 | ○ | 4.6 | 1.5 | 1.53 | 3.1 |
| 164 | Ex. | 1.31 | 3.2 | ○ | 4.8 | 1.4 | 1.60 | 3.4 |
| 165 | Ex. | 1.38 | 2.5 | ◎ | 5.8 | 0.6 | 1.93 | 9.7 |
| 16 | Ex. | 1.46 | 2.7 | ◎ | 6.3 | 0.7 | 2.10 | 9.0 |
| 167 | Ex. | 1.41 | 2.2 | ◎ | 6.1 | 0.6 | 2.03 | 10.2 |
| 168 | Ex. | 1.45 | 2.7 | ○ | 6.3 | 0.7 | 2.10 | 9.0 |
| 169 | Ex. | 1.42 | 3.8 | ○ | 5.3 | 0.6 | 1.77 | 8.8 |
| 170 | Ex. | 1.43 | 9.7 | ○ | 4.9 | 0.5 | 1.63 | 9.8 |

In Experimental Example 7, saturation magnetic flux density, coercivity, and resistivity were good in all Examples. Moreover, coercivity was better in Examples where the Fe based nanocrystallines had an average grain size of 5 to 30 nm, and coercivity was particularly better in Examples where the Fe based nanocrystallines had an average grain size of 10 to 30 nm.

Experimental Example 8

Experimental Example 8 was carried out with the same conditions as Sample No. 16 except that the roller temperature and the vapor pressure in the chamber were changed. Experimental Example 8 was evaluated in a similar manner to Experimental Example 1. Table 12 shows the results. In Table 12, samples described as “Ar filling” are a sample where a vapor pressure in a chamber was set to 1 hPa or less by filling the chamber with argon whose dew-point was adjusted, and samples described as “vacuum” are a sample where a vapor pressure was set to 1 hPa or less while the chamber was in a state close to vacuum.

TABLE 12

| Sample No. | Example/ Comparative Example | roller temperature (° C.) | vapor pressure in chamber (hPa) | saturation magnetic flux density Bs (T) | coercivity Hc (A/m) | resistivity ρ |
|---|---|---|---|---|---|---|
| 171 | Comp. Ex. | 70 | 25 | 1.34 | 4.3 | X |
| 172 | Comp. Ex. | 70 | 18 | 1.36 | 4.1 | X |
| 173 | Ex. | 70 | 11 | 1.41 | 2.7 | ○ |
| 16 | Ex. | 70 | 4 | 1.46 | 2.7 | ◎ |
| 174 | Ex. | 70 | Ar filling | 1.46 | 2.8 | ◎ |
| 175 | Ex. | 70 | vacuum | 1.47 | 2.7 | ◎ |
| 176 | Comp. Ex. | 50 | 25 | 1.32 | 4.8 | X |
| 177 | Comp. Ex. | 50 | 18 | 1.37 | 4.7 | X |
| 178 | Ex. | 50 | 11 | 1.42 | 3.1 | ○ |
| 179 | Ex. | 50 | 4 | 1.48 | 2.9 | ○ |
| 180 | Ex. | 50 | Ar filling | 1.45 | 2.9 | ◎ |
| 181 | Ex. | 50 | vacuum | 1.46 | 3.1 | ◎ |
| 182 | Comp. Ex. | 30 | 25 | 1.32 | 4.8 | X |

TABLE 12-continued

| | | | | | | |
|---|---|---|---|---|---|---|
| 183 | Comp. Ex. | 30 | 18 | 1.37 | 4.7 | X |
| 184 | Comp. Ex. | 30 | 11 | 1.42 | 3.1 | X |
| 185 | Comp. Ex. | 30 | 4 | 1.48 | 2.9 | X |
| 186 | Comp. Ex. | 30 | Ar filling | 1.45 | 2.9 | X |
| 187 | Comp. Ex. | 30 | vacuum | 1.46 | 3.1 | X |

| Sample No. | Fe-poor phase average concentration of P at % | Fe-rich phase average concentration of P at % | average concentration of P in Fe-poor phase/ average concentration of P in each alloy | average concentration of P in Fe-poor phase/ average concentration of P in Fe-rich phase |
|---|---|---|---|---|
| 171 | 4.2 | 2.3 | 1.40 | 1.8 |
| 172 | 4.3 | 2.1 | 1.43 | 2.0 |
| 173 | 5.3 | 1.1 | 1.77 | 4.8 |
| 16 | 6.3 | 0.7 | 2.10 | 9.0 |
| 174 | 6.5 | 0.7 | 2.17 | 9.3 |
| 175 | 6.7 | 0.6 | 2.23 | 11.2 |
| 176 | 3.8 | 2.5 | 1.27 | 1.5 |
| 177 | 4.2 | 3.6 | 1.40 | 1.2 |
| 178 | 4.8 | 1.0 | 1.60 | 4.8 |
| 179 | 5.6 | 0.9 | 1.87 | 6.2 |
| 180 | 6.3 | 0.7 | 2.10 | 9.0 |
| 181 | 6.6 | 0.6 | 2.20 | 11.0 |
| 182 | 3.8 | 2.5 | 1.27 | 1.5 |
| 183 | 4.2 | 2.3 | 1.40 | 1.8 |
| 184 | 4.2 | 2.4 | 1.40 | 1.8 |
| 185 | 4.2 | 2.4 | 1.40 | 1.8 |
| 186 | 4.3 | 2.3 | 1.43 | 1.9 |
| 187 | 4.4 | 2.1 | 1.47 | 2.1 |

Table 12 shows that amorphous ribbons were obtained in Examples whose roller temperature was 50 to 70° C. and vapor pressure was controlled to 11 hPa or less in the chamber. These ribbons underwent a heat treatment appropriately, and Fe-poor phases having a high concentration of P and Fe-rich phases having a low concentration of P were thereby formed. Then, obtained was a soft magnetic alloy having a high saturation magnetic flux density Bs, a low coercivity Hc, and a high resistivity ρ.

In Comparative Examples whose roller temperature was 30° C. (Sample No. 182 to Sample No. 187) or Comparative Examples whose roller temperature was 50° C. or 70° C. and vapor pressure was higher than 11 hPa (Sample No. 171, Sample No. 172, Sample No. 176, and Sample No. 177), however, Fe-poor phases were not generated after the heat treatment or an average concentration of P in Fe-poor phases was not sufficiently high even if the Fe-poor phases were generated, and one or more of saturation magnetic flux density Bs, coercivity Hc, and resistivity ρ were deteriorated.

NUMERICAL REFERENCES

11 . . . Fe-rich phase
13 . . . Fe-poor phase
31 . . . nozzle
32 . . . molten metal
33 . . . roller
34 . . . ribbon
35 . . . chamber

What is claimed is:

1. A soft magnetic alloy comprising:

a main component of Fe; and

P, wherein a Fe-rich phase and a Fe-poor phase are contained, and an average concentration of P in the Fe-poor phase is 1.5 times or larger than an average concentration of P in the soft magnetic alloy by number of atoms, and the soft magnetic alloy consists of a composition formula of $(Fe_{1-\alpha}X_{\alpha})_{(1-(a+b+c+d+e))}Cu_aM1_bP_cM2_dSi_e$, in which X is Co, M1 is one or more of Ti, Zr, Hf, Nb, Ta, Mo, V, W, Cr, Al, Mn, Zn, La, Y, and S, M2 is one or more of B and C, $0 \le a \le 0.001$ is satisfied, $0.040 \le b \le 0.150$ is satisfied, $0.001 \le c \le 0.150$ is satisfied, $0 \le d \le 0.200$ is satisfied, $0 \le e \le 0.200$ is satisfied, and $0 \le \alpha \le 0.500$ is satisfied, wherein a, b, c, d, e and α each represent an atomic ratio.

2. The soft magnetic alloy according to claim 1, wherein the average concentration of P in the Fe-poor phase is 1.0 at % or more and 50 at % or less.

3. The soft magnetic alloy according to claim 1, wherein the average concentration of P in the Fe-poor phase is 3.0 times or larger than an average concentration of P in the Fe-rich phase.

4. The soft magnetic alloy according to claim 2, wherein the average concentration of P in the Fe-poor phase is 3.0 times or larger than an average concentration of P in the Fe-rich phase.

5. The soft magnetic alloy according to claim 1, comprising Fe based nanocrystallines.

6. The soft magnetic alloy according to claim 5, wherein the Fe based nanocrystallines have an average grain size of 5 nm or more and 30 nm or less.

7. The soft magnetic alloy according to claim 1, comprising a ribbon shape.

8. The soft magnetic alloy according to claim 1, comprising a powder shape.

9. A magnetic device comprising the soft magnetic alloy according to claim 1.

* * * * *